United States Patent

Yoshida et al.

[11] Patent Number: 5,930,006
[45] Date of Patent: *Jul. 27, 1999

[54] IMAGE EDITING APPARATUS

[75] Inventors: Akinori Yoshida, Nishio; Takeshi Morikawa; Motomi Takemoto, both of Toyokawa, all of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/739,700

[22] Filed: Oct. 29, 1996

[30] Foreign Application Priority Data

Oct. 30, 1995 [JP] Japan .................................. 7-281994

[51] Int. Cl.$^6$ ........................... H04N 1/387; H04N 1/40; H04N 1/00
[52] U.S. Cl. ......................... 358/450; 358/450; 358/452; 358/459; 358/451; 358/448; 358/401
[58] Field of Search .................................... 358/450, 452, 358/459, 451, 448, 401

[56] References Cited

U.S. PATENT DOCUMENTS

| | | | |
|---|---|---|---|
| 4,933,777 | 6/1990 | Hsieh et al. | 358/456 |
| 5,475,475 | 12/1995 | Kotani et al. | 358/450 |

FOREIGN PATENT DOCUMENTS

| | | | |
|---|---|---|---|
| 6-2171380 | 7/1987 | Japan | H04N 1/393 |
| 3-186058 | 8/1991 | Japan . | |
| 4-153787 | 5/1992 | Japan . | |

*Primary Examiner*—Edward L. Coles
*Assistant Examiner*—Twyler Lamb
*Attorney, Agent, or Firm*—McDermott, Will & Emery

[57] ABSTRACT

An image editing apparatus which is capable of assembling a plurality of original documents on one sheet as an output data without impairing the legibility of characters in the reduced images. This apparatus reads images in original documents, detects the size of characters in the read original documents, sets the number of original document images to be produced per page for the output data based on the detected character size, and reduces and edits the read image data into the output data having the set number of original document images per page.

14 Claims, 30 Drawing Sheets

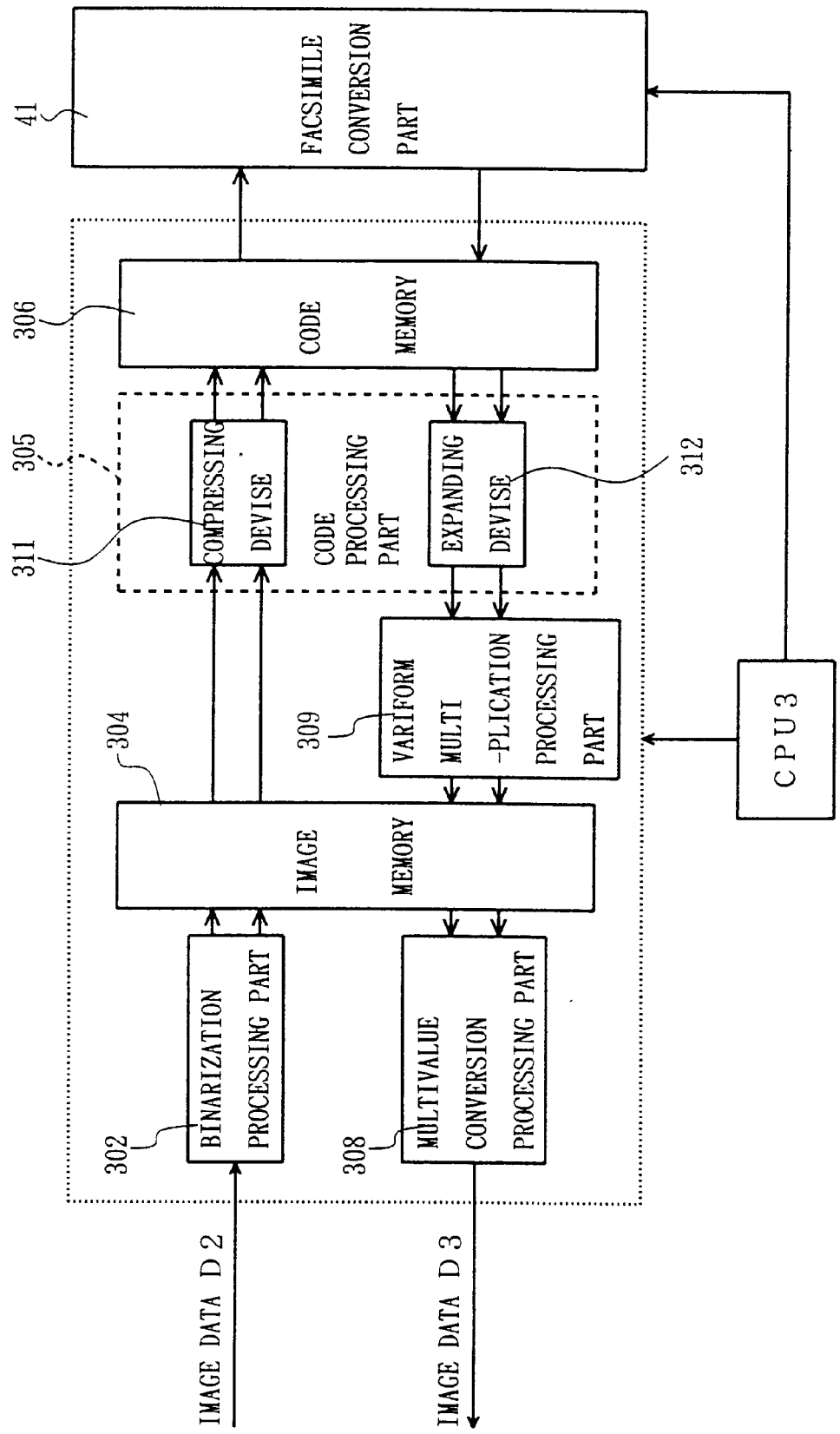

Fig.6A (MEMORY CAPACITY)

| | REGION | CONTRACTED CODE DATE |
|---|---|---|
| 0 — | 01 | CODE DATE 1 OF PAGE 1 |
| 32K — | 02 | CODE DATE 2 OF PAGE 1 |
| 64K — | 03 | CODE DATE 1 OF PAGE 2 |
| 96K — | 04 | CODE DATE 2 OF PAGE 2 |
| 128K — | ⋮ | |

Fig.6B (MANAGEMENT TABLE MT)

| REGION | PAGE | PRE-LINK | POST-LINK | ADDITIVE DATA |
|---|---|---|---|---|
| 01 | 1 | 00 | 02 | |
| 02 | 1 | 01 | FF | |
| 03 | 2 | 00 | 04 | |
| 04 | 2 | 03 | FF | |
| ⋮ | | | | |

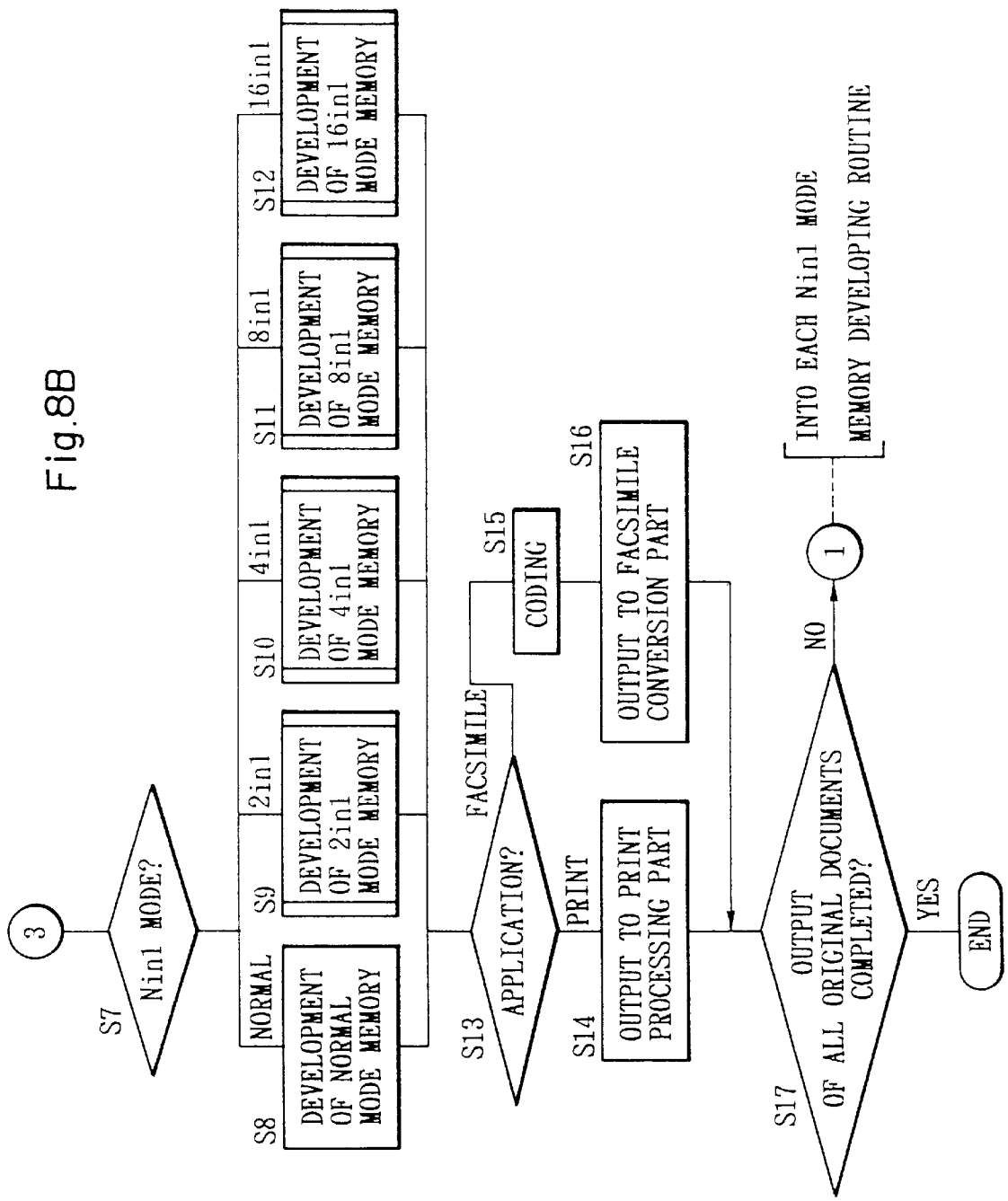

Fig.13

TABLE OF CONTRAST BETWEEN CHARACTER SIZE
AND NUMBER OF Nin1 ORIGINAL DOCUMENTS

| NUMBER OF PIXELS IN DIRECTION OF HEIGHT OF CHARACTERS ON INPUT IMAGE | NUMBER OF Nin1 ORIGINAL DOCUMENTS | RATIO OF REDUCTION | NUMBER OF PIXELS IN DIRECTION OF HEIGHT OF CHARACTERS ON OUTPUT IMAGE |
|---|---|---|---|
| 85 ~ | 16 | ×0.250 | 21 ~ |
| 60 ~ 85 | 8 | ×0.356 | 21 ~ 30 |
| 40 ~ 60 | 4 | ×0.500 | 20 ~ 30 |
| 30 ~ 40 | 2 | ×0.707 | 21 ~ 28 |
| ~ 30 | 1 | ×1.000 | ~ 30 |

Fig.14

ORIGINAL DOCUMENT MANAGING TABLE DT

| PAGE | LENGTH IN DIRECTION OF MAIN SCANNING OF ORIGINAL DOCUMENT | LENGTH IN DIRECTION OF SUB-SCANNING OF ORIGINAL DOCUMENT | NUMGER OF Nin1 ORIGINAL DOCUMENTS |
|---|---|---|---|
| 1 | 297 | 210 | 8 |
| 2 | 297 | 210 | 4 |
| 3 | 297 | 210 | 4 |
| 4 | 297 | 210 | 8 |
| 5 | 297 | 210 | 2 |
| ... | ... | ... | ... |

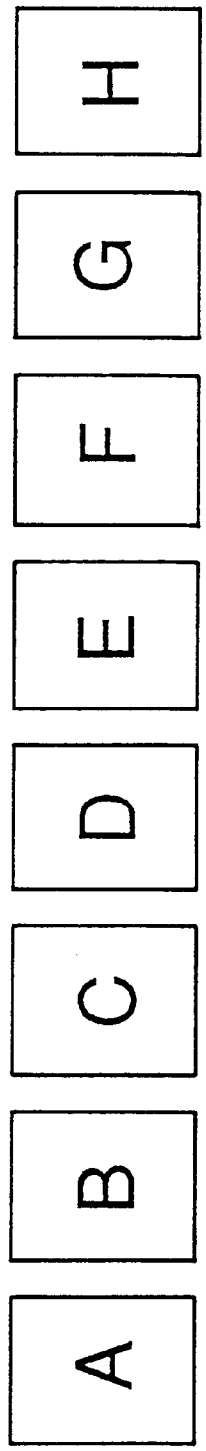
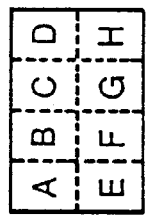
Fig. 18

ORIGINAL
DOCUMENT

OUTPUT

Fig. 20

ORIGINAL DOCUMENT

| 123456789 ABCDEFG HIJKLMN あいうえ 漢字漢字 | 123456789 ABCDEFG HIJKLMN あいうえ 漢字漢字 | 123456789 ABCDEFG HIJKLMN あいうえ 漢字漢字 | 123456789 ABCDEFG HIJKLMN あいうえ 漢字漢字 | 123456789 ABCDEFG HIJKLMN あいうえ 漢字漢字 | 123456789 ABCDEFG HIJKLMN あいうえ 漢字漢字 | 123456789 ABCDEFG HIJKLMN あいうえ 漢字漢字 | 123456789 ABCDEFG HIJKLMN あいうえ 漢字漢字 |

2in1 (N=2)

OUTPUT

| 123456789 ABCDEFG HIJKLMN あいうえ 漢字漢字 | 123456789 ABCDEFG HIJKLMN あいうえ 漢字漢字 | 123456789 ABCDEFG HIJKLMN あいうえ 漢字漢字 | 123456789 ABCDEFG HIJKLMN あいうえ 漢字漢字 | 123456789 ABCDEFG HIJKLMN あいうえ 漢字漢字 | 123456789 ABCDEFG HIJKLMN あいうえ 漢字漢字 | 123456789 ABCDEFG HIJKLMN あいうえ 漢字漢字 | 123456789 ABCDEFG HIJKLMN あいうえ 漢字漢字 |

Fig.28
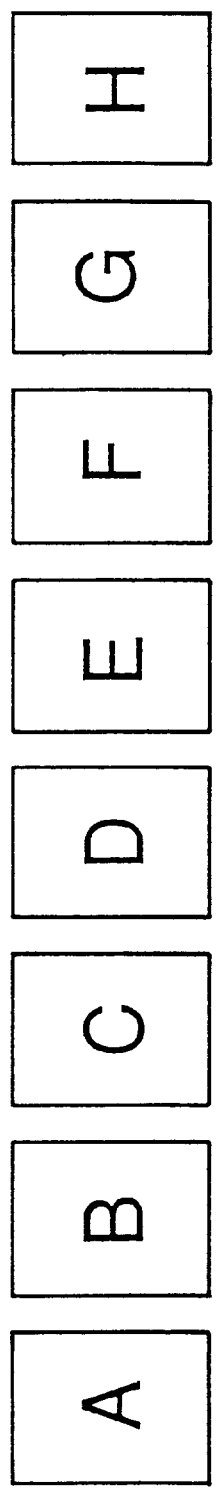
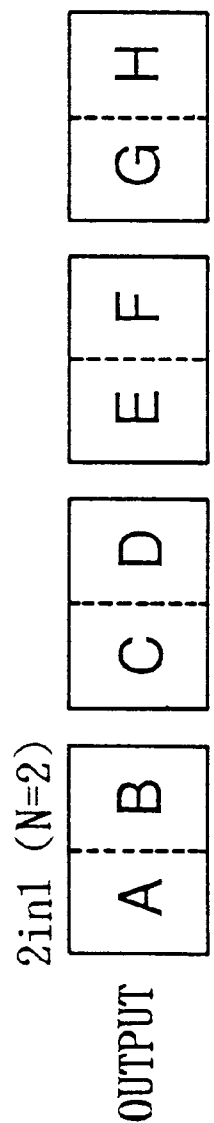
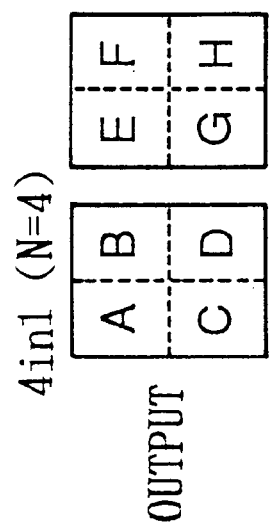
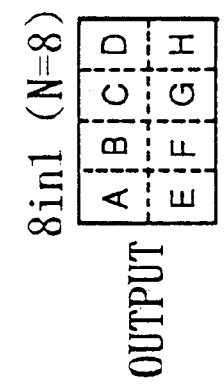
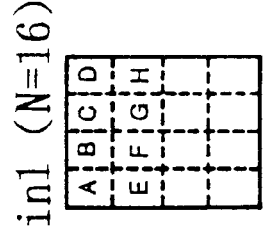

IMAGE EDITING APPARATUS

BACKGROUND OF THE INVENTION

1. Field of the Invention

This invention relates to an image editing apparatus which reduces images on a plurality of original documents, arranges a prescribed number of reduced images on one sheet, and produces the sheet bearing the arranged reduced images as an output.

2. Description of the Prior Art

The image forming apparatus, such as the facsimile devices, the reproducing devices and the like, which are endowed with the image editing function of reducing images on a plurality of original documents, arranging a prescribed number of reduced images on one sheet, and producing the sheet bearing the arranged reduced images as an output have been known in the art.

FIG. 28 is a conceptual diagram illustrating a typical output obtained by the use of this image edit function (herein-after referred to as "Nin1 edit"). According to the Nin1 edit, the plurality of original documents, A–H, are produced in the form of reduced images arranged in a varying prescribed number (N) on one sheet as illustrated in the diagram.

In the diagram, "2in1" is an example of output having every two of the original documents produced per sheet. By the same token, "4in1" is an example of output having every four of the original documents, "8in1" every eight of the original documents, and "16in1" every 16 of the original documents produced per sheet.

The Nin1 edit of this principle requires a small number of sheets as compared with the number of original documents and, therefore, can be expected to permit a reduction in the cost of sheet and a saving on the filing space.

Basically in the Nin1 edit, since reduced images of original documents are produced on sheets which are identical in size with the original documents, the reduction ratio of images becomes greater in proportion as the number of original documents produced on a sheet increases. The Nin1 edit, therefore, has the possibility that, depending on the size of characters printed in the original documents, the characters in the produced images will suffer seriously impaired legibility and, in the worst case, will become totally illegible. (see FIG. 29)

For the purpose of enhancing the effect of the Nin1 edit in saving the filing space, an idea of producing reduced images of original documents on sheets of a size smaller than the size of original documents may be conceived. Heretofore, this concept has necessitated a preparatory procedure of first determining the size of the sheet to be used for producing reduced images and then setting the number of original documents allowed to be produced on each sheet. The above-mentioned conventional method, therefore, has the problem of complicating the operation thereof with the extra procedure and augmenting the chances of miscopying.

SUMMARY OF THE INVENTION

An object of this invention is that, in an image editing apparatus endowed with an Nin1 edit function, the legibility of characters in the produced images is compatible with the effect of lowering the cost of sheet and the effect of allowing a saving on the space for filing owing to the Nin1 edit with a simple operation.

One image editing apparatus according to this invention comprises reading means for reading image data from a plurality of original documents, character size detecting means for detecting the character size on the original documents based on the read image data, number setting means for setting the number of original document images to be produced in one page based on the character size detected by the character size detecting means, and editing means for reducing and editing the read image data into the output data having such a number of original document images per page as set by the number setting means.

This apparatus, therefore, can produce output images by the most economical Nin1 edit without a sacrifice of the legibility of output images and can simplify the operation required therefor because it is enabled to detect the character size in the read original documents and, based on the detected character size, set the number of original document images to be produced as output data per page of sheet.

Another image editing apparatus according to this invention comprises reading means for reading image data from a plurality of original documents, number input means for feeding the number of original document images to be produced per page, editing means for reducing and editing the read image data into the output data having such a number of original document images per page as fed by the number input means, character size detecting means for detecting the size of characters on the original documents based on the read image data, and judging means for, based on the character size detercted by the character size detecting means, judging whether or not the image edit of the editing means with the number fed by the number input means is acceptable.

This apparatus can prevent the original documents from being reproduced by such an Nin1 edit as deprives the output images of legibility and permit them to be reproduced instead by an Nin1 edit free from waste because it is enabled to set freely the number of original document images to be produced as output data on one sheet, detect the character size of read original documents and, based on the detected character size, judge whether or not the set number of original documents can be produced as output data on one sheet.

Yet another image editing apparatus according to this invention comprises reading means for reading image data from a plurality of original documents, number input means for feeding the number of original document images to be produced per page, editing means for reducing and editing the read image data into the output data having such a number of original document images per page as fed by the number input means, character size detecting means for detecting the size of characters on the original documents based on the read image data, and sheet selecting means for selecting the size of sheet on which the original document images as output are printed based on the character size detected by the character size detecting means and the number fed by the number input means.

This apparatus can effect automatic selection of the optimum sheets without impairing the legibility of characters in the images produced for output data and, even when the read original documents and the original documents produced for output data are different in size, save the time and labor otherwise required for setting the reduction ratio, and produce the output images by the most economical Nin1 edit easily without impairing the legibility of characters in the imaged produced for output data because it is enabled to set freely the number of original documents to be produced as output data per sheet, determine the reduction ratio from the character size in the images of read original documents preparatorily to the Nin1 edit, and select the size of sheet appropriate for the set number of original documents to be produced as output data per sheet.

BRIEF DESCRIPTION OF THE DRAWINGS

FIG. 5 is a block diagram to aid in the description of a memory unit part of the reproducing machine mentioned above.

FIGS. 6(A) and (B) are diagrams to aid in the description of the state of memory of code data and the table of management in the reproducing machine mentioned above.

FIG. 13 is a diagram to aid in the description of a table of correspondence between the character size and the number of Nin1 original documents in the automatic Nin1 edit function mentioned above.

FIG. 14 is a diagram to aid in the description of the table of management of original documents in the automatic Nin1 edit function mentioned above.

FIG. 18 is a diagram to aid in the description of the outcome of the execution of reproduction by the automatic Nin1 edit function mentioned above.

FIG. 19 is a diagram to aid in the description of the outcome of the execution of reproduction by the automatic Nin1 edit function mentioned above.

FIG. 20 is a diagram to aid in the description of the outcome of the execution of reproduction by the automatic Nin1 edit function mentioned above.

FIG. 28 is a diagram to aid in the description of the Nin1 edit.

DETAILED DESCRIPTION OF THE INVENTION

Now, one embodiment of this invention will be described below with reference to the accompanying drawings.

First, the construction of a reproducing machine embodying this invention and the basic operation of the reproducing machine will be described. Then, the operation of the Nin1 image edit in the reproducing machine according to this invention will be described.

Figure 1:
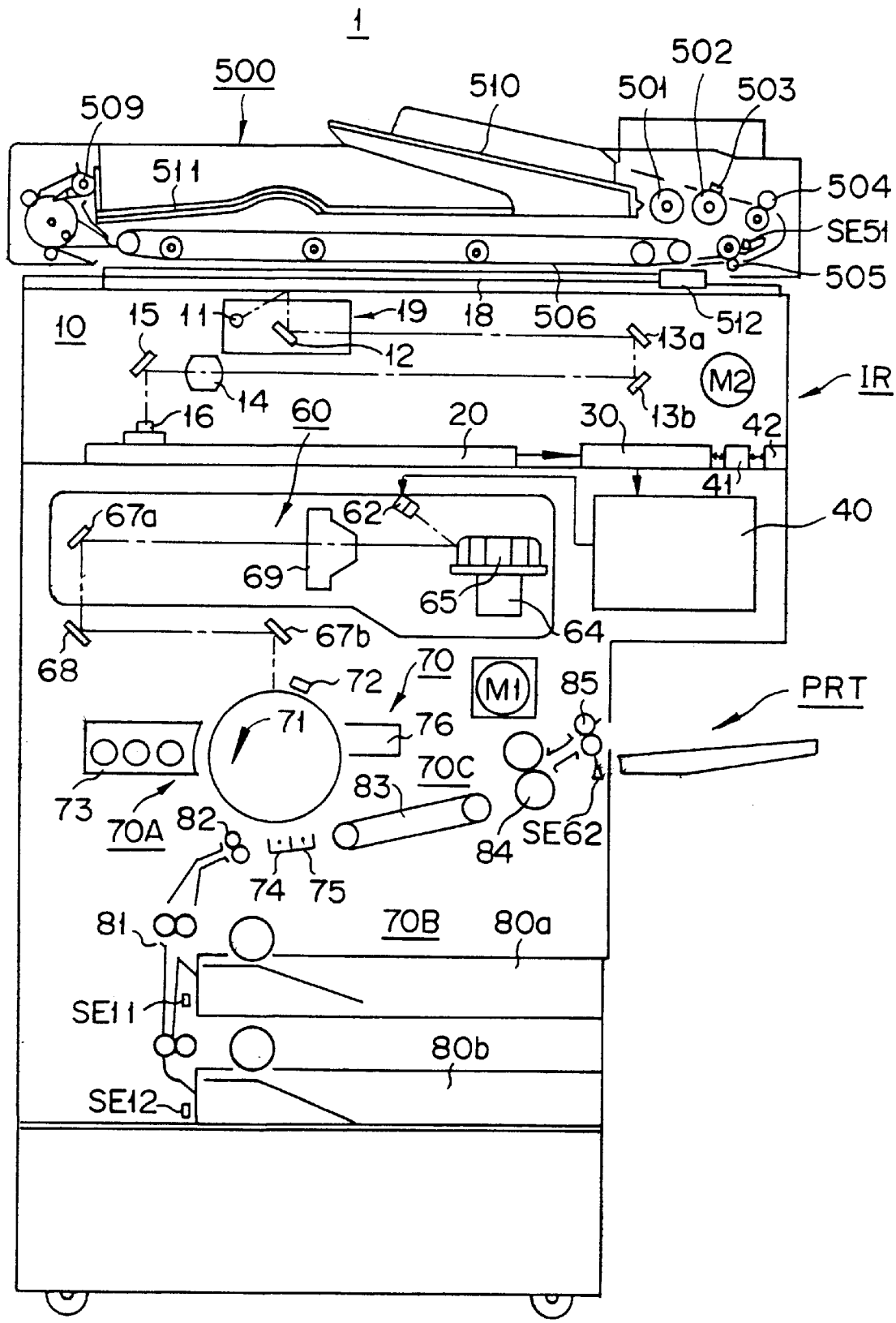
FIG. 1 is a diagram to aid in the description of a reproducing machine embodying this invention.
Figure 2:
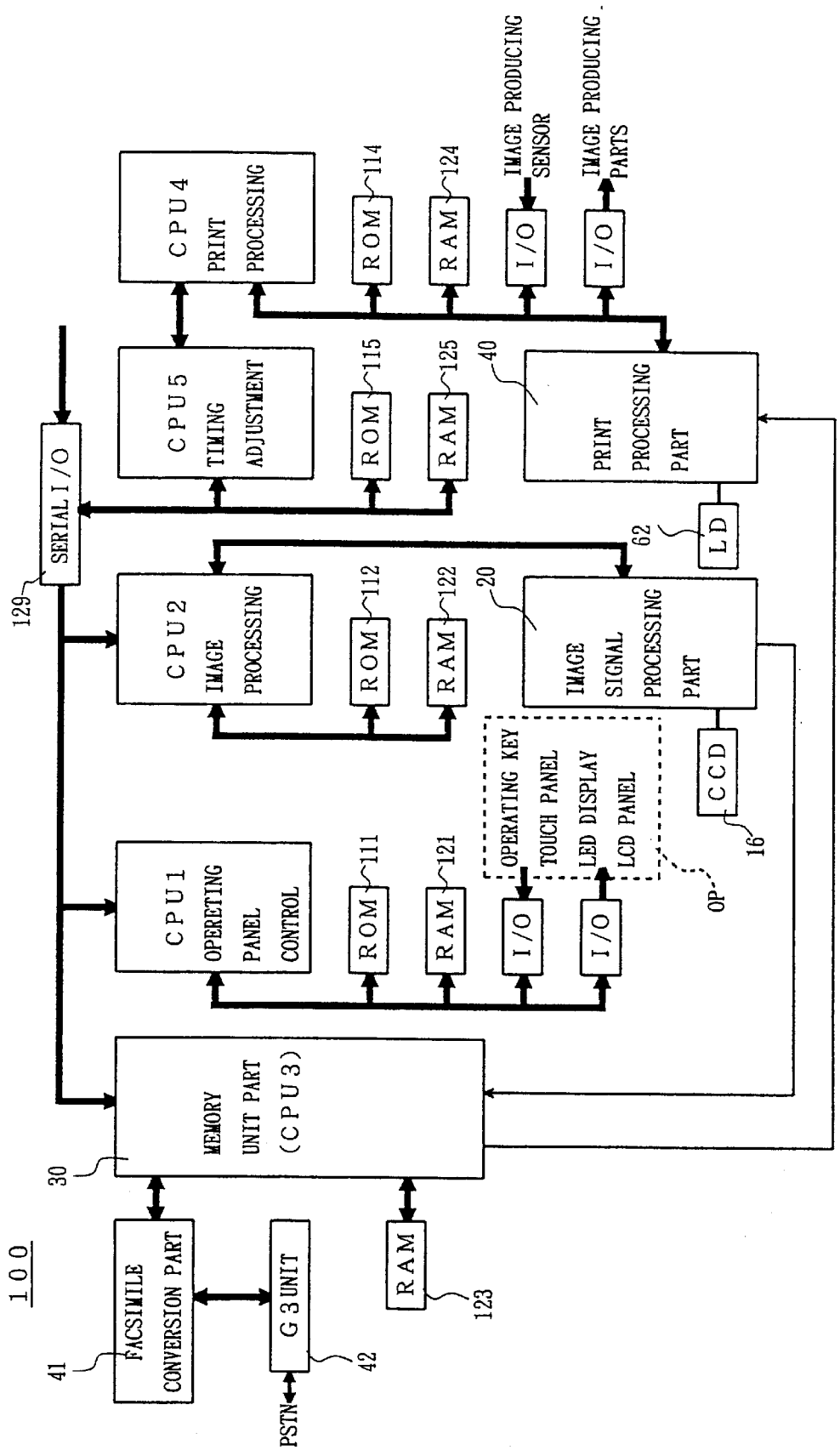
FIG. 2 is a block diagram to aid in the description of a control system in the reproducing machine mentioned above.

FIG. 1 is a schematic diagram to aid in the description of the whole construction of a reproducing machine embodying this invention and FIG. 2 is a block diagram of the control system.

This reproducing machine 1 is a so-called digital reproducing machine. Broadly, this reproducing machine is composed of an image reading device IR consisting of a scanning system 10 for reading original documents for reproduction and an image signal processing part 20 for processing read image data and a printer device PRT consisting of a print processing part 40 for producing read image data on a sheet, an optical system 60, and an image-producing system 70.

In the upper part of the reproducing machine 1, an automatic document forwarding device (ADF) 500 for forwarding an original document to be reproduced and, when necessary, turning the original document upside down is disposed. An operating panel OP for designating operating modes for various image editing steps to be performed in the reproducing machine 1 is disposed on the upper side of the reproducing machine 1. Further, the reproducing machine is provided with a facsimile conversion part 41 and a G3 unit 42 for fulfilling the function of a facsimile.

The image reading device IR is provided with a memory unit part 30 for performing various image editing processes such as, for example, the process of reducing or enlarging images and the process for the Nin1 edit.

As respects the operation of the reproducing machine 1, in the image reading device IR, the image data which has been read by the scanning system 10 is processed by the image signal processing part 20. The image data so processed is provisionally stored in the memory unit part 30, subjected to various image editing processes, and then produced in the form of an output image on a sheet by the printer device PRT. As the function of a facsimile, the facsimile conversion part 41 converts the image data which has been stored provisionally in the memory unit part 30 and subjected to the image editing processes into facsimile data and transmits the facsimile data. The facsimile conversion part 41, on receiving data, converts it into image data and causes the image data to be printed out by the printer device PRT.

The operation of the reproducing machine described above is controlled by a controlling part 100. The controlling part 100, as illustrated in FIG. 2, is composed chiefly of CPU 1–5 serving to control the reproducing machine and processing data and CPU 6 (FIG. 3) serving to control the ADF 500. These CPU 1–6 are provided respectively with ROM 111, 112, 114–116 for storing their respective programs and RAM 121–126 serving as work areas for executing the programs.

CPU 1 is intended to control the input and display of the signals from the various operating keys on the operating panel OP.

CPU 2 is intended to control the various parts in the image signal processing part 20 and control the drive of the scanning system 10.

CPU 3 controls the memory unit part 30 which discharges the role of memorizing image data as by writing therein or reading therefrom image data of read original documents or data received by facsimile. The various image editing processes including the Nin1 edit function according to this invention are also fulfilled by this CPU 3.

CPU 4 controls the print processing part 40, the print grade optical system 60, and the image-forming system 70.

CPU 5 as a host CPU plays the part of adjusting the overall timing of the control part 100 and setting the operation modes.

Then, CPU 6 communicates with the CPU 5 through the medium of a serial I/O 129 and controls the ADF 500.

Now, the functions and operations of the component parts will be further described in detail below.

Figure 3:
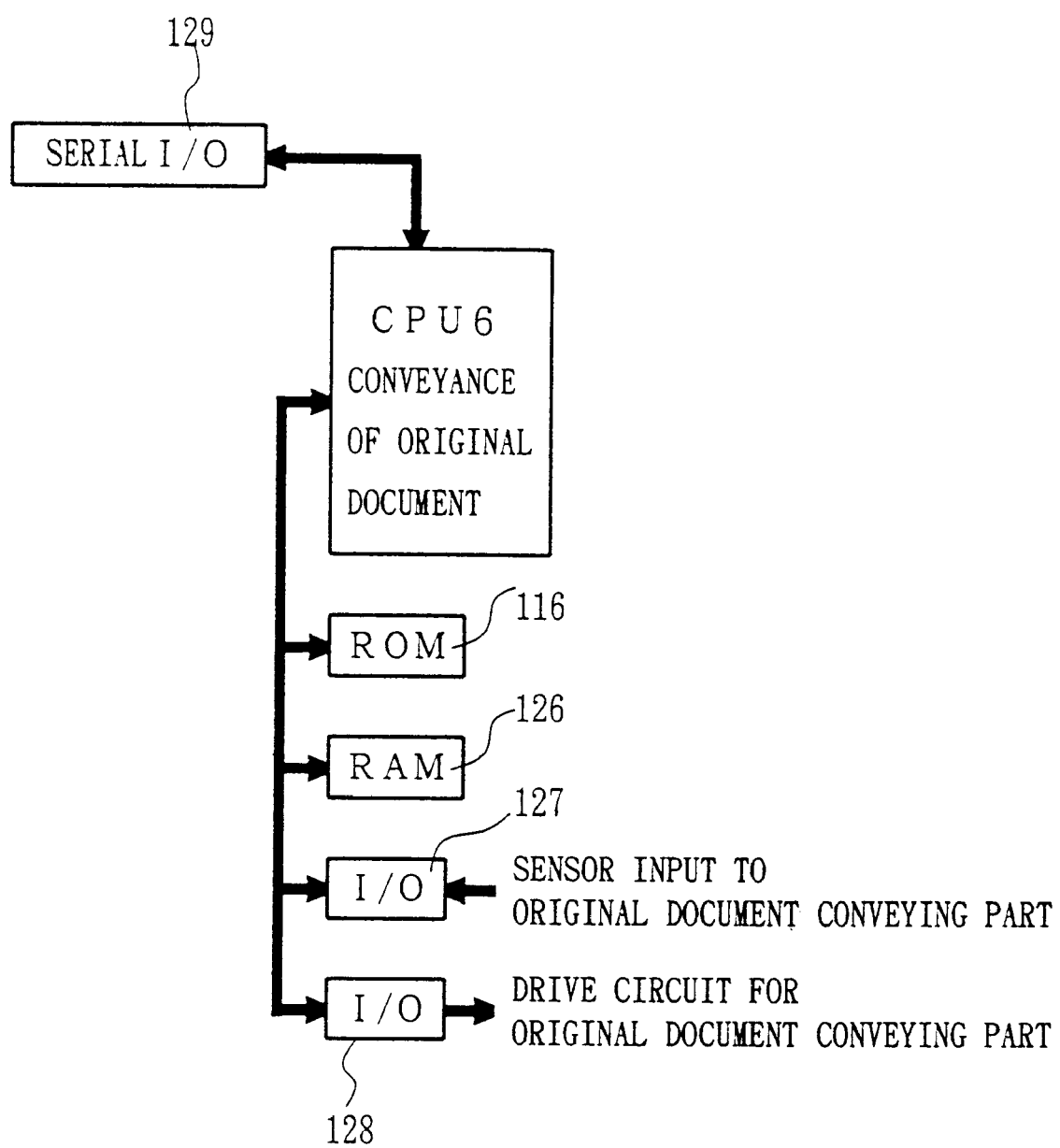
FIG. 3 is a block diagram to aid in the description of a control system in an automatic original document conveying device in the reproducing machine mentioned above.

The ADF 500 which is provided for the reproducing machine 1 is controlled by such a control system as illustrated in the block diagram of FIG. 3. The original documents set on the original document tray 510, in response to a command from the CPU 6, are conveyed one by one to a prescribed position on an original document mounting stand (platen glass) 18, read by the scanning system 10, and discharged onto a sheet discharge tray 511. The signal issued from the CPU 6 to convey an original document is transmitted to the drive circuit of an original document conveying part through the medium of an I/O interface 128 to actuate original document conveying rollers 501, 502, 503, 504, 505, and 509 and a conveyor belt 506 in the ADF 500 and produce a joint conveying motion.

While the original document is being conveyed, the size thereof is detected by virtue of the ON-OFF duration produced by the sensor SE51 which is installed inside the ADF 500. The signal from the sensor SE51 is transmitted to the CUP 6 through the medium of the I/O interface 127. The size of the original document is judged from the signal from the sensor SE51. The result of this judgment is forwarded to the CPU 5 and used during the formation of an original document management table DT. The original document management table DT which will be described more specifically hereinafter is a data table to be used during the Nin1 edit. As illustrated in FIG. 14, this is a table of correspondence between each of the original documents which have been read and the number (N) of original documents to be produced on one sheet (hereinafter referred to as "number of Nin1 original documents").

In the scanning system 10, a scanner 19 is driven by a scan motor M2 and moved under the platen glass 18. An exposure lamp 11 attached to the scanner 19 projects light on the original document mounted on the platen glass 18. The light reflected on the original document is guided by a first mirror 12 disposed on the scanner 19 and a second mirror 13$a$, a third mirror 13$b$, an optical lens 14, and a fourth mirror 15 which are stationary components to a CCD 16 which is a photoelectric conversion element to implement the scanning of the image on the original document. In this scanning system 10, the drive timing of the scanner 19 for conveying the original document mentioned above and scanning the conveyed original document is adjusted by the CPU 5.

The signal produced in consequence of the photoelectric conversion by the CCD 16 of the scanning system 10 is fed into the image signal processing part 20, subjected to an A/D conversion so as to be handled as digital data, and then given image quality compensations such as the shading compensation, the MTF compensation, and the gamma compensation.

Figure 4:
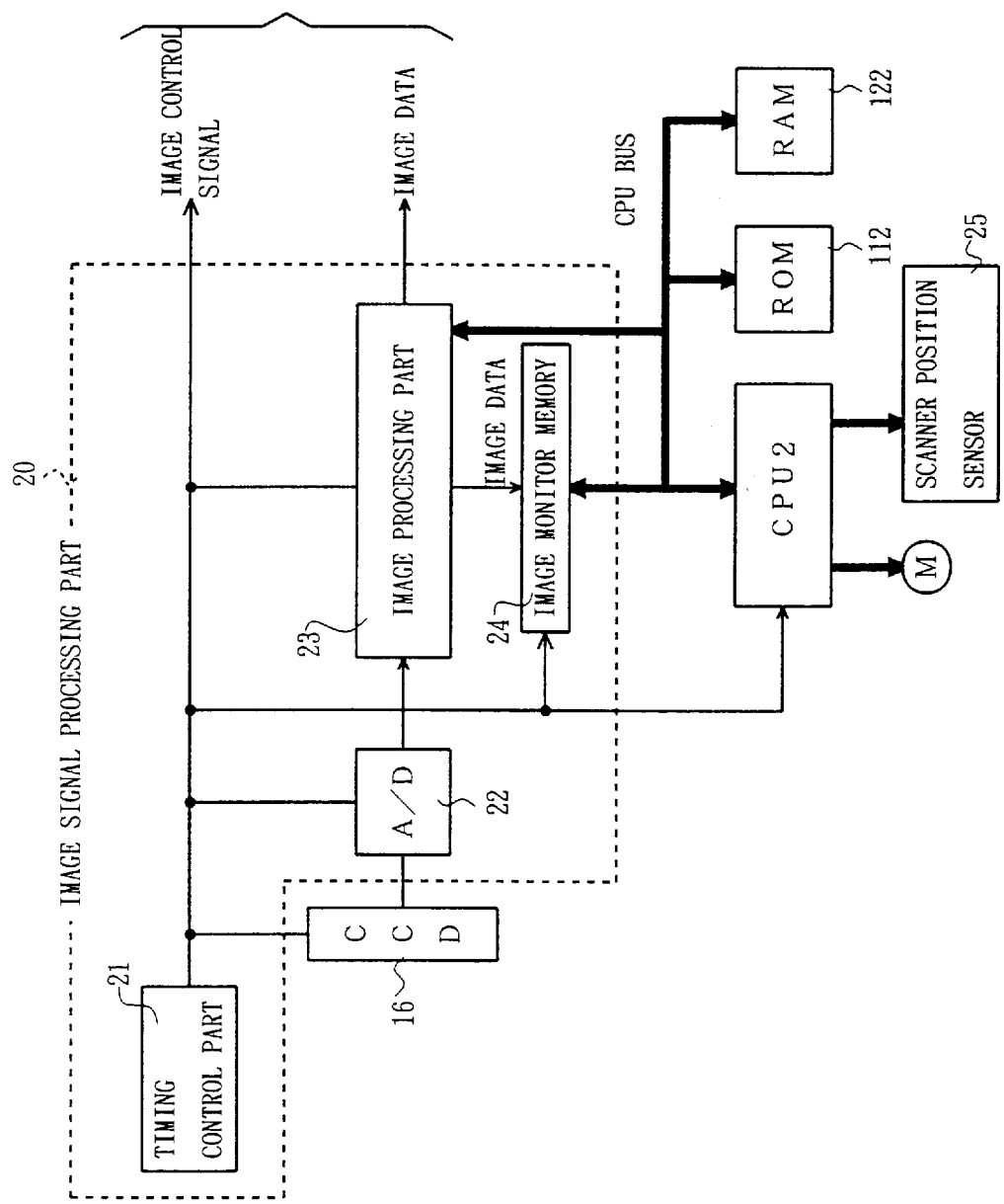
FIG. 4 is a block diagram to aid in the description of an image signal processing part of the reproducing machine mentioned above.

The image signal processing part 20, as illustrated in FIG. 4, is composed of a timing control part 21 for producing an image read synchronizing signal (image control signal), an A/D conversion part 22 for converting the signal from the CCD 16 into a digital image signal, an image processing part 23 for performing an image processing for the image quality compensation, and an image monitor memory 24 for memorizing one line full of image data after another in the main scanning direction.

The digital image signal produced by the conversion in the A/D conversion part 22 is transferred to the image processing part 23 and processed therein for image quality compensations such as the shading compensation, the MTF compensation, and the gamma compensation. The image data resulting from the image quality compensations is forwarded to the memory unit part 30.

The CPU 2 effects such controls for image reading as the setting of a parameter for the image processing part 23, the controlling of scan by the driving of the scan motor, and the communication with the host CPU 5.

The memory unit part 30, as illustrated in FIG. 5, is composed of a binarization processing part 302 for producing binary data based on the parameter setting effected by the CPU 3, a multiport image memory 304 having a capacity for two A-4 pages at 400 dpi, a code processing part 305 possessed of independently operable compressing device 311 and expanding device 312, a multiport code memory 306, a variform multiplication processing part 309, a multi-value conversion processing part 308 for producing multi-value data based on the parameter setting effected by the CPU 3, and the CPU 3 for controlling all these components.

In the memory unit part 30, when the Nin1 edit, the variform multiplication, etc. are carried out as controlled by the CPU 3, image data D2 resulting from the image quality compensations at the image processing part 23 are converted into binary data by the binarization processing part 302 and stored in the image memory 304. During the process of the Nin1 edit, the CPU 3 detects the character size in the original document based on the image data stored in the image memory 304 and selects the number of Nin1 original documents corresponding to the character size in the original document to produce the original document managing table DT illustrated in FIG. 14. The original document managing table DT thus produced is memorized in a RAM 123. The detection of the character size and the selection of the number of Nin1 original documents will be specifically described hereinbelow.

The code processing part 305, in response to a command from the CPU 3, reads the image data stored in the image memory 304 and causes the compressing device 311 to compress and encode the image data to produce a code data and write the code data in the code memory 306.

The expanding device 312, in response to a command from the CPU 3, reads the code data from the code memory 306, expands and decodes the code data, produces one sheet full of image data, and writes the image data in the image memory 304 at a location designated by the CPU 3.

Further, during the course of the Nin1 edit, the expanding device 312 reads a plurality of pages full of code data to be produced as output data on one sheet from the code memory 306 and expands and decodes the code data and the variform multiplication processing part 309 reduces the images and writes one sheet full of the reduced images as image data at a location of the image memory 304 designated by the CPU 3.

The one sheet full of image data written in the image memory 304 in consequence of the expansion is read out by the multi-value conversion processing part 308 and converted into a multi-value image data. When the multi-value image data is to be printed out, it is produced as the image data D3 in the print processing part 40 and printed out on the sheet by the optical system 60 and the image-forming system 70. When the multi-value image data is to be transmitted by facsimile, the one sheet full of image data written in the image memory 304 is read out, encoded by the compressing device 311, stored in the code memory 306, and produced in the form of a code data in the facsimile conversion part 41.

The compressing device 311 and the expanding device 312 are mutually independent and are capable of parallel motion and the DMA transmission of data proceeds between the compressing device 311 and the expanding device 312 on the one hand and the code memory 306 on the other hand.

The code memory 306, as illustrated in FIG. 6A, is divided into memory areas each of the unit of 32 K bytes. These memory areas severally incorporate therein a relevant code data in consideration of the possible simultaneous control of the write and read of the code data. This code memory 306 is managed by the managing table MT stored in the RAM 123.

The managing table MT, as illustrated in FIG. 6B, contains area numbers and page numbers of the code memory 306, numbers of linked areas, and various added information such as the method of compression and the data length which are necessary for the compression and expansion processings. Based on these various kinds of information, the code memory 306 is dynamically managed. In FIG. 6B, the information under the heading "pre-link" indicates the forward linkage of the 32-Kbyte area of the relevant page and tells whether or not the area is the first of areas. The two-digit numeral "00" denotes a first area and any other two-digit numeral denotes a preceding area number. Similarly, the information under the heading "post-link" indicates the rearward linkage of the 32-Kbyte area of the relevant page and tells whether or not the area is the last of areas. The two-digit numeral "FF" denotes a last area and any other two-digit numeral denotes a following area number.

The printout on a sheet for output data is effected by the fact that the print processing part 40 controlled by the CPU 4 drives a semiconductor laser 62 in the optical system 60 in accordance with the image data D3 from the memory unit part 30 and the image-forming system 70 prints out the images on the sheet.

The optical system 60 is composed of the semiconductor laser 62, a polygon mirror 65 for deflecting a laser beam, a main lens 69, and reflecting mirrors 67a, 67b, and 68 and the image-forming system 70 is composed of a developing and transferring system 70A, a conveying system 70B for conveying sheet, and a fixing system 70C for fixing an image.

The laser beam generated by the drive of the print processing part 40 is advanced through the polygon mirror 65, the main lens 69, and the reflecting mirrors 67a, 68, and 67b and projected on a photosensitive drum 71 of the developing and transferring system 70A to form an image thereon. As a result, an electrostatic latent image is formed on the photosensitive drum 71. Further, this electrostatic latent image is developed by a developing device 73 and a toner image is formed on the photosensitive drum 71. Then, this toner image is transferred by a transfer charger 74 of the developing and transferring system 70 onto the sheet which has been conveyed by the conveying system 70B. The fixing system 70C fixes the image transferred onto the sheet. The sheet having the image thus fixed thereon is discharged.

The developing and transferring system 70A is composed of an electric charger 72 for charging the photosensitive drum 71, the developing device 73 for storing a developing agent and feeding a toner to the photosensitive drum 71, a transfer charger 74 for transferring the toner image on the photosensitive drum 71 onto the sheet, a separation charger 75 for separating the sheet and the photosensitive drum 71 from each other, and a cleaning part 76 for removing unnecessary toner besides the photosensitive drum 71. The developing agent used herein is a binary developing agent consisting of a black toner and a carrier serving to disperse the black toner.

The conveying system 70B is composed of cassettes 80a and 80b holding stacks of sheet, sheet size detecting sensors SE11 and SE12 for detecting sizes of sheet, a sheet guide 81, a timing roller 82, and a conveyor belt 83.

The fixing system 70C is composed of a fixing roller 84 for conveying the sheet while keeping the sheet under simultaneous application of heat and pressure, a discharge roller 85, and a discharge sensor SE62 for detecting the discharge of the sheet.

The transmission of data by facsimile is effected by the fact that the facsimile conversion part 41 converts the data to the data for facsimile communication and the G3 unit 42 dials the other party of the facsimile communication.

The facsimile conversion part 41 is interposed between the memory unit part 30 and the G3 unit 42 and intended to effect data conversion during the course of reception and transmission of facsimile. It changes the density of pixels in the image data, enlarges or reduces the image data, changes the bit width of the code data, and changes the mode of encoding the code data (for conversion to the data for G3), for example. Incidentally, this facsimile conversion part 41 is controlled by the CPU 3 so as to fulfill these processings.

Figure 7:
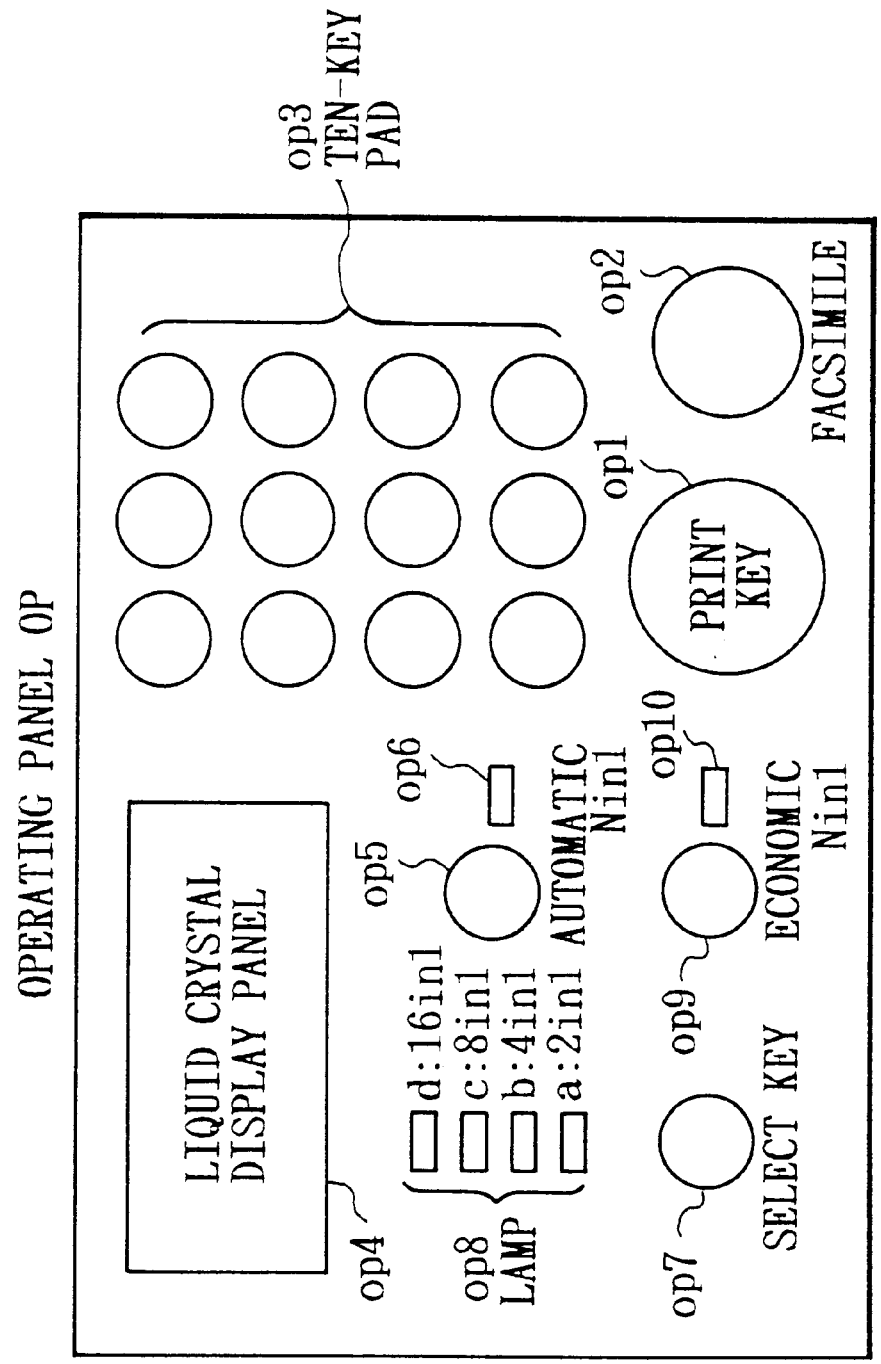
FIG. 7 is a diagram illustrating one example of the operating panel of the reproducing machine mentioned above.

The operating panel OP provided on this reproducing machine 1, as illustrated in FIG. 7, has mounted thereon a print key op1 for designating the start of a reproducing operation, a FAX key op2 for designating facsimile transmission, a ten key op3 for injecting the number of reproduced copies to be produced or the telephone number necessary at the time of facsimile transmission, a liquid crystal display panel op4 for displaying message, and, in the form of operating keys and display lamps for designating three Nin1 edit functions which will be described specifically herein below, an automatic Nin1 key op5 for designating an automatic Nin1 edit function and a display lamp op6 for designating the state, a select key op7 for designating a manual Nin1 edit function and setting the Nin1 mode at that time and a display lamp op8 for designating the existing Nin1 mode, an economized Nin1 key op9 for designating an economized Nin1 edit function and a display lamp op10 designating the state. Here, the term "Nin1 mode" denotes the Nin1 edit modes, i.e. a 2in1, a 4in1, a 8in1, and 16in1 edit modes (this definition will similarly apply hereinafter).

This operating panel OP is controlled by the CPU 1. The CPU 1 discerns the inputs through the operating keys, transmits the introduced designations to the CPU 5, and produces various messages on the liquid crystal display panel op4.

The basic functions and operations of the component parts of the reproducing machine 1 have been described.

Now, the Nin1 edit functions discharged by the reproducing machine 1 will be described below.

This reproducing machine 1 has three Nin1 edit functions. The first Nin1 edit function resides in automatically selecting the optimum number of Nin1 original documents to be assembled in the form of reduced images on the sheet of the same size as the size of the read original documents bearing the images being reproduced without impairing the legibility of characters in the reduced images and producing the reduced images on the sheet. This function will be referred to hereinafter as an "automatic Nin1 edit function." The second Nin1 edit function resides in preparatorily feeding in and setting (setting of Nin1 mode) the number of original documents to be produced as arranged in the form of reduced images for output data on one sheet and, when the reduced images produced as output data in accordance with the setNin1 mode do not impair the legibility of characters in the images, producing the plurality of reduced images of the original documents on one sheet in accordance with the setting and, when the produced reduced images impair the legibility of characters, issuing an alarm about the state and suspending the processing. This function will be referred to hereinafter as a "manual Nin1 edit function." The third Nin1 edit function resides in preparatorily feeding in and setting (setting of Nin1 mode) the number of original documents to be produced in the form of reduced images for output data on one sheet, selecting the sheet of the smallest size that avoids impairing the legibility of the characters in the reduced images which are produced as output data in accordance with the set Nin1 mode, and producing the plurality of the reduced images of the original documents as output data on the selected sheet in accordance with the set Nin1 mode. This function will be referred to hereinafter as an "economized Nin1 edit function." Now, these three Nin1 edit functions will be sequentially described below.

First, the first Nin1 edit function (automatic Nin1 edit function) will be described.

Figure 8A:
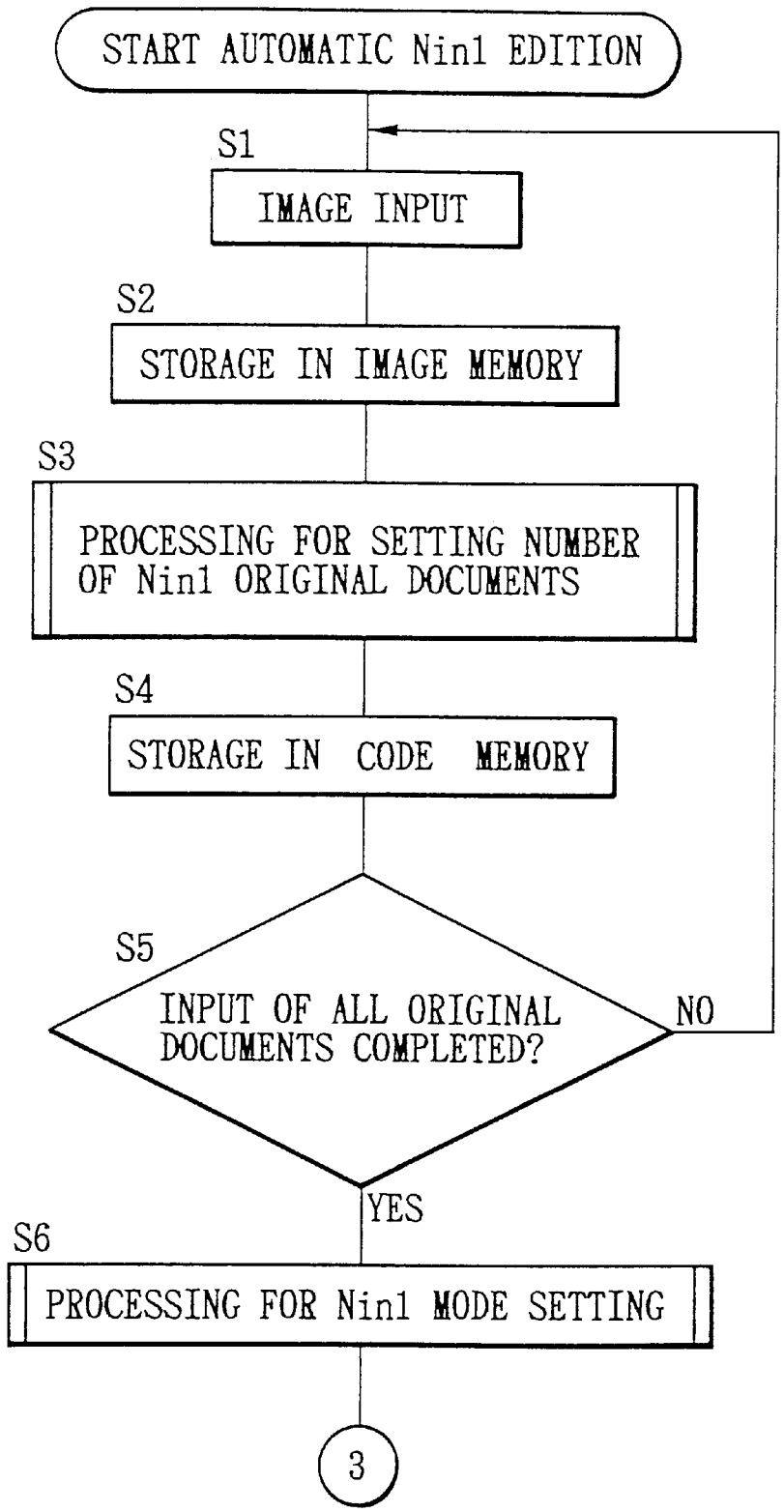
FIGS. 8(A) and (B) are flow charts illustrating the whole process of the automatic Nin1 edit function embodying the present invention.

FIG. 8 is a flow chart illustrating the flow of the entire operation of the automatic Nin1 edit function.

The automatic Nin1 edit function is selected by the depression of the automatic Nin1 key op4 on the operating panel OP of the reproducing machine 1. The plurality of original documents set in the ADF 500 are conveyed one by one onto the platen glass 18 when the print key op1 for the print out or the FAX key op2 for the facsimile transmission is depressed. First, the image on the first of the original documents is read out (image input, S1). At the same time that the original document is conveyed, the size of the original document is detected by the sensor SE51 and the size of the original document is memorized in the original document managing table DT (FIG. 14).

Then, the one original document that has undergone the image input is subjected at the image signal processing part 20 to such image processings as the shading compensation, the MTF compensation, and the gamma compensation. Subsequently, at the memory unit part 30, the image data is stored in the image memory 304 (S2).

Based on the image data stored in the image memory 304, the number of Nin1 original documents is set (processing for setting the number of Nin1 original documents, S3). The processing for setting the number of Nin1 original documents which will be more specifically described herein below effects the judgment of the character size in the read original documents, the selection of the number of Nin1 original documents, and the storage of the selected number of Nin1 original documents in the original document managing table DT.

Then, the image data is encoded and stored in the code memory 306 and, at the same time, used for the formation of the management table MT (S4).

The question of whether or not all the original documents set in the ADF 500 have been read out and the processings mentioned above have been completed is decided (S5). When this question draws a negative answer, the processings of the steps, S1–S5, are repeated to read out and process the following original documents.

After all the original documents have been read out and processed, the original document managing table DT is read out, the Nin1 mode is set (S6) by selecting the smallest number of Nin1 original documents found in the original document managing table DT, the set Nin1 mode is judged (S7), and the original documents are developed each as one sheet full of image data on the image memory 304 (S8–S12). Thus, the plurality of original documents which have been read out are developed by the same Nin1 mode as image data on the image memory 304. The setting of the Nin1 mode (S6) and the developments in the image memory (S9–S12) will be specifically described hereinafter.

Then, the destination (application) for the sheet full of image data developed on the image memory 304 is selected between the printout and the facsimile transmission by the input made in advance through the operating panel OP (S13). In the case of the printout, the image data developed on the image memory 304 is fed out into the print processing part 40 (S14) and is ultimately printed out on the sheet of the same size as the size of original documents to be detected during the course of image input. In the case of the facsimile transmission, the image data is again encoded (S15), fed out to the facsimile conversion part 41, and transmitted through the telephone number of the other party of facsimile transmission introduced in advance (at the time of setting the original document).

Then, the question of whether or not the image data of all the original documents has been produced as output data is judged (S17). When this question draws out a negative answer, the processing returns to the subroutine (S8–S12) for development of memory and the development of memory and the processing for output are continued until the image data of all the original documents is fed out.

Figure 9:
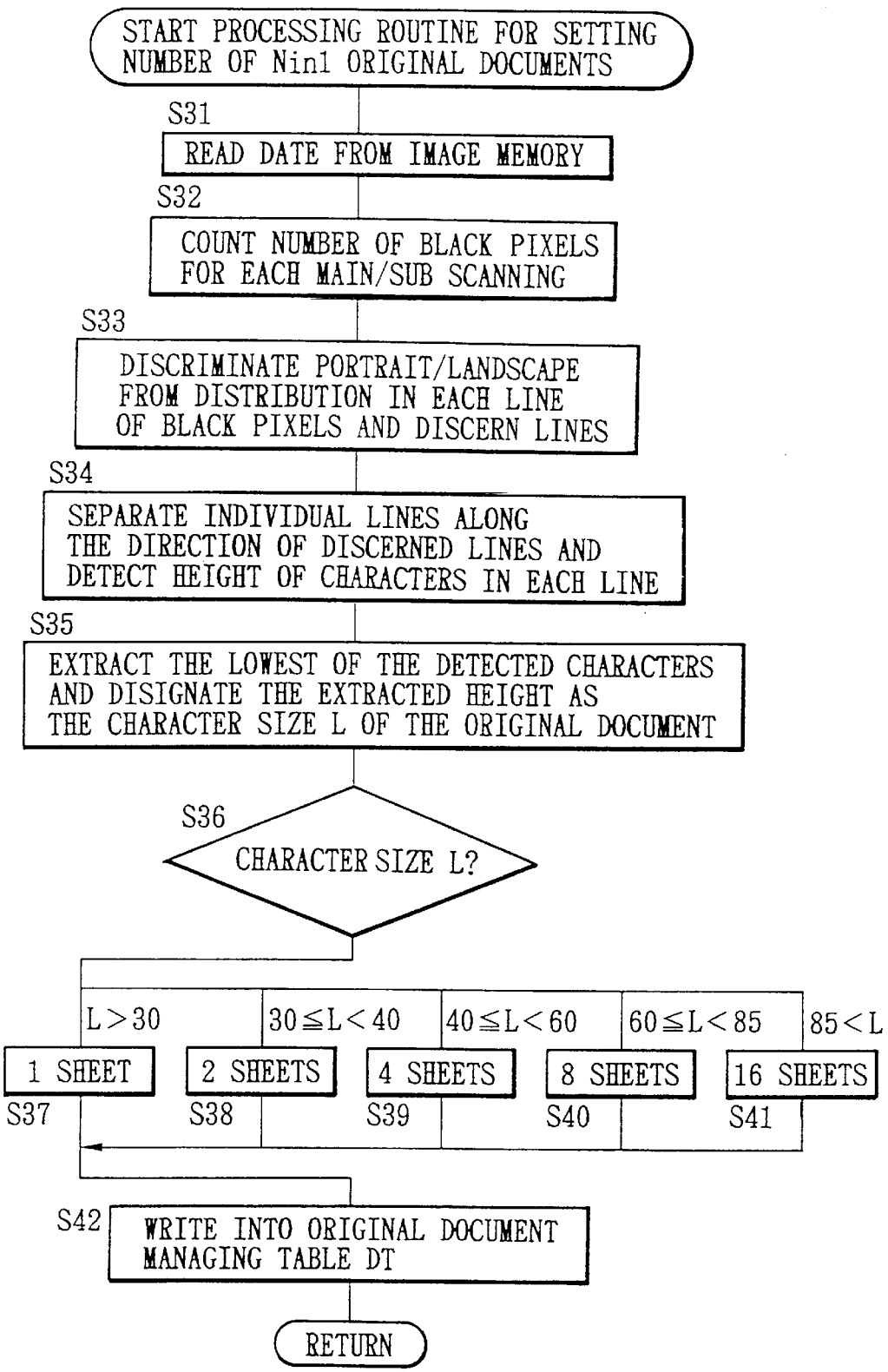
FIG. 9 is a flow chart illustrating the process for setting the number of Nin1 original documents in the automatic Nin1 edit function mentioned above.

FIG. 9 is a flow chart illustrating the flow of the processing for setting the number of the Nin1 original documents at the step S3 mentioned above.

In the processing for setting the number of Nin1 original documents, the one original document full of image data stored in the image memory 304 is read out (S31), the number of black pixels is counted per each direction of main and sub scanning (S32), and the discrimination between a portrait original document and a landscape original document is made based on the distribution of black pixels in each line of the main and sub scanning (S33). This discrimination is made for the purpose of judging the height (or width) of characters as the character size which will be specifically described herein below.

Figure 10A:
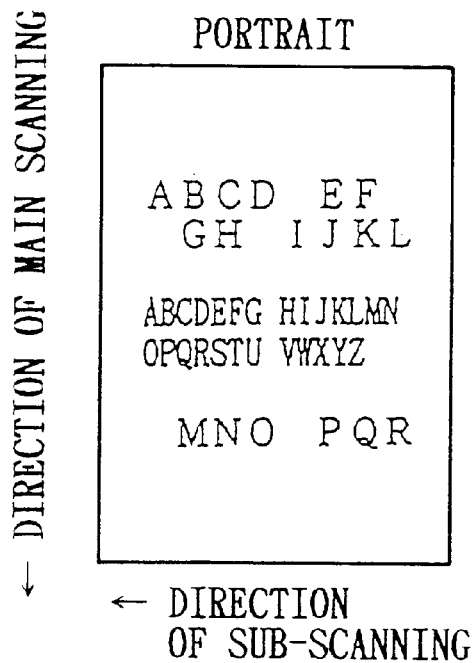
FIGS. 10(A) and (B) are diagrams to aid in the description of a portrait original document and a landscape original document.
Figure 10B:
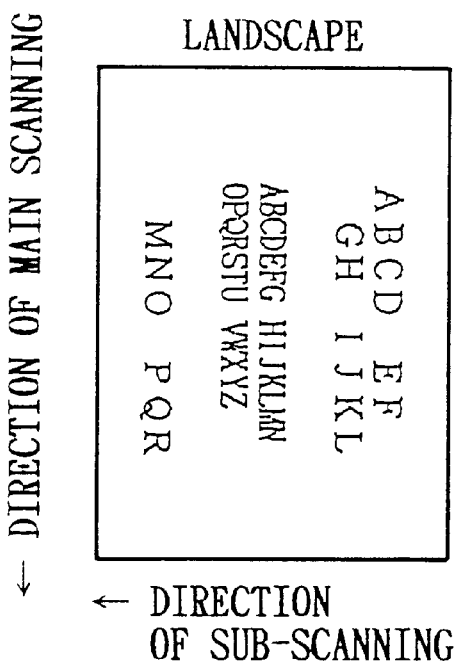

In the portrait original document, the characters are erect when the longitudinal direction of the sheet falls in the vertical direction, namely the characters are arranged relative to the direction of sub scanning, as illustrated in FIG. 10A. In the landscape original document, the characters are erect when the longitudinal direction of the sheet falls in the horizontal direction, namely the characters are arranged relative to the direction of main scanning as shown in FIG. 10B.

This discrimination between the portrait original document and the landscape original document is implemented by judging the question of whether or not the data appearing in the successive pixels in the direction of main scanning and those in the direction of sub scanning consists of black pixels (whether the data is "0" or "1") while the image data is read out from the image memory 304 at the step S31, counting the number of black pixels (data "1") (S32), and consequently determining the distribution of the counts of black pixels in individual lines in the directions of main and sub scanning. In the case of the portrait original document, since the distribution having the characters arranged in the direction of sub scanning has a higher density than the distribution having the lines arranged in the direction of main scanning as in the histogram illustrated in FIG. 11A, it is judged that the lines are arranged in the direction of main scanning. In the case of the landscape original document, since the distribution having the characters arranged in the direction of main scanning has a higher density than the distribution having the lines arranged in the direction of sub scanning as in the histogram illustrated in FIG. 11B, it is judged that the lines are arranged in the direction of sub scanning.

Figure 12A:
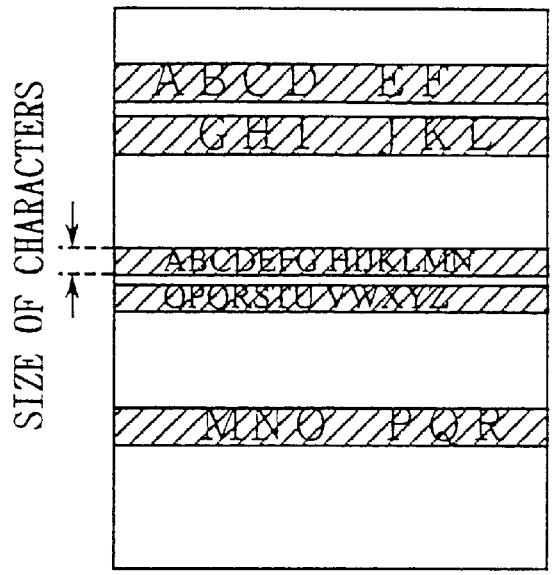
FIGS. 12(A) and (B) are diagrams to aid in the description of the detection of the character size in the automatic Nin1 edit function mentioned above.
Figure 12B:
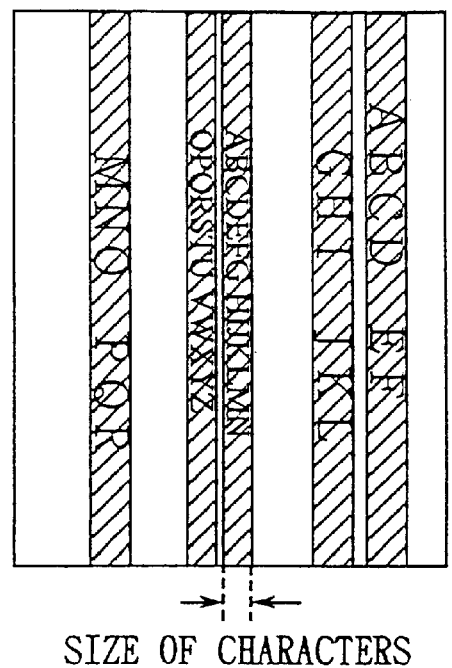

Then, the individual lines are cut out as illustrated in FIGS. 12A and 12B and the heights of these lines are detected as the character size (S34). This character size is found by counting the number of pixels in the individual lines and consequently fixing their heights. In the case of original documents having characters arranged in horizontal lines, the width of lines or the width of characters is detected as the character size.

Then, the lowest (or the narrowest) of the detected character sizes or the detected heights (or widths) of the individual lines, namely the size of the smallest number of pixels in the direction of height (width), is adopted as the character size L of the original document (S35).

Then, the number of the Nin1 original documents of the original document under discussion is selected from the character size L of the original document (S36–S41). The number of Nin1 original documents is selected based on the table of correspondence between the character size and the number of Nin1 original documents which shows the correspondence of the prefixed character size to the number of Nin1 original documents using the character size as illustrated in FIG. 13. This table of correspondence between the character size and the number of Nin1 original documents assumes that in the automatic Nin1 edit function, the size of eligible characters is such that the number of pixels on the produced images equals a height of not less than 20 pixels. This table of correspondence between the character size and the number of Nin1 original documents also shows correspondence between the number of Nin1 original documents and the reduction ratio. This correspondence has been decided on the precondition that in the automatic Nin1 edit function, the output by a given reduction ratio is produced on a sheet of the same size as the original document bearing the image being reproduced.

Then, the selected numbers of Nin1 original documents are written in the individual pages on the original document managing table DT to complete this original document managing table DT (S42). At the time that the reading of all the set original documents is completed, the correspondence between the size of individual original documents and the number of Nin1 original documents is completed as shown in FIG. 14.

Figure 15:
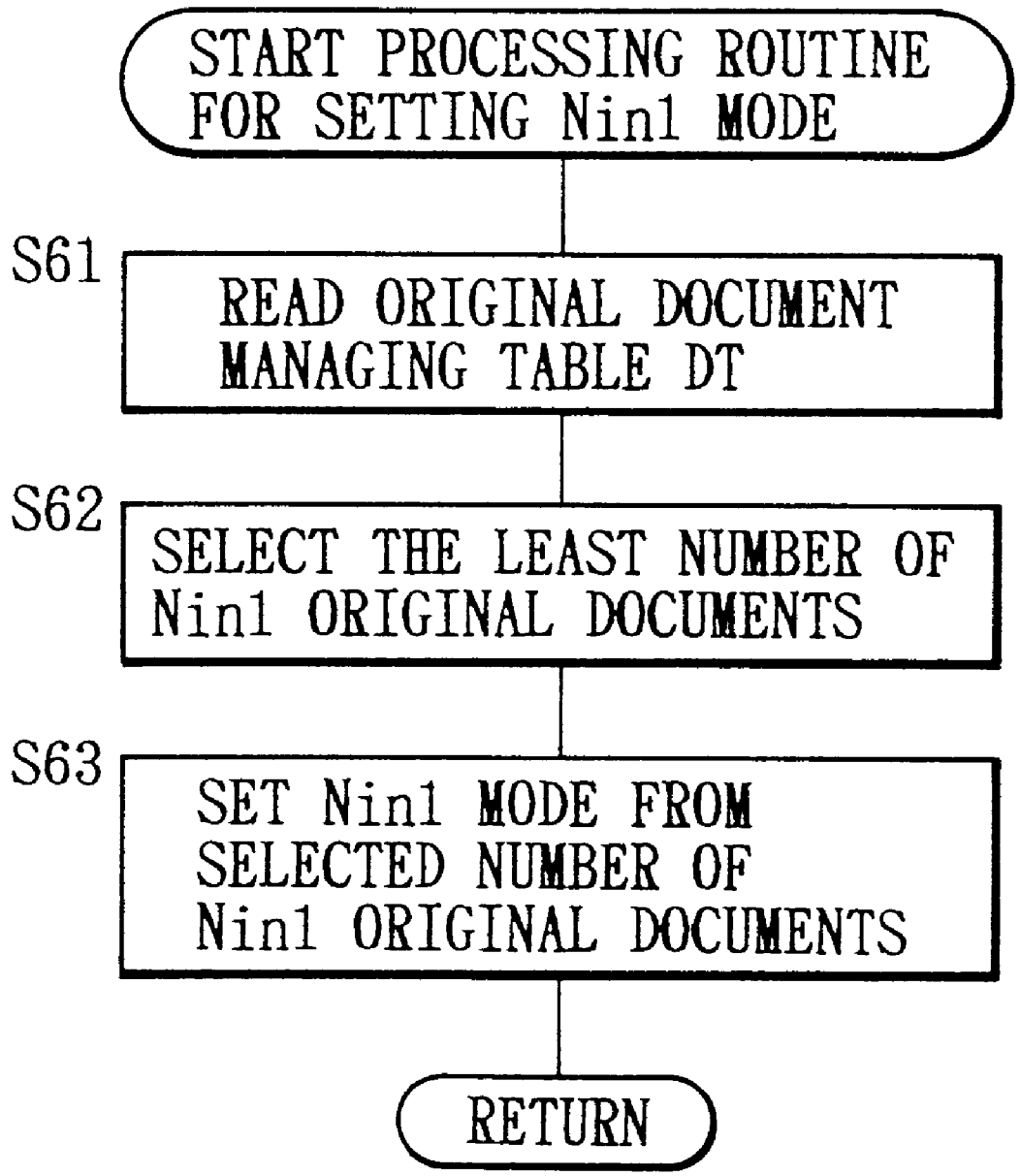
FIG. 15 is a flow chart illustrating the process for setting the Nin1 mode in the automatic Nin1 edit function mentioned above.

Now, the processing for setting the Nin1 mode for the memory development (S6 in the diagram of FIG. 8) will be described below. FIG. 15 is a flow chart of the processing for setting the Nin1 mode.

First, the original document managing table DT is read out (S61), the smallest of the numbers of Nin1 original documents is selected from the original document managing table DT (S62), and the Nin1 mode for producing the selected number of Nin1 original documents on one sheet is set (S63). As a result, the Nin1 mode is set which allows the original document containing the smallest character size (the original documents with a high possibility of impairing legibility of characters) in all the plurality of read original documents to be reduced to such an extent as avoids impairing the legibility. Here, the ordinary mode is set when none of the Nin1 modes avoids impairing the legibility of characters, namely when "1" exists as the number of Nin1 original documents in the original document managing table DT.

Now, the processings for developing the output image in the image memory 304 in accordance with the set Nin1 mode (S8–S12 in the diagram of FIG. 8) will be described below.

Figure 16:
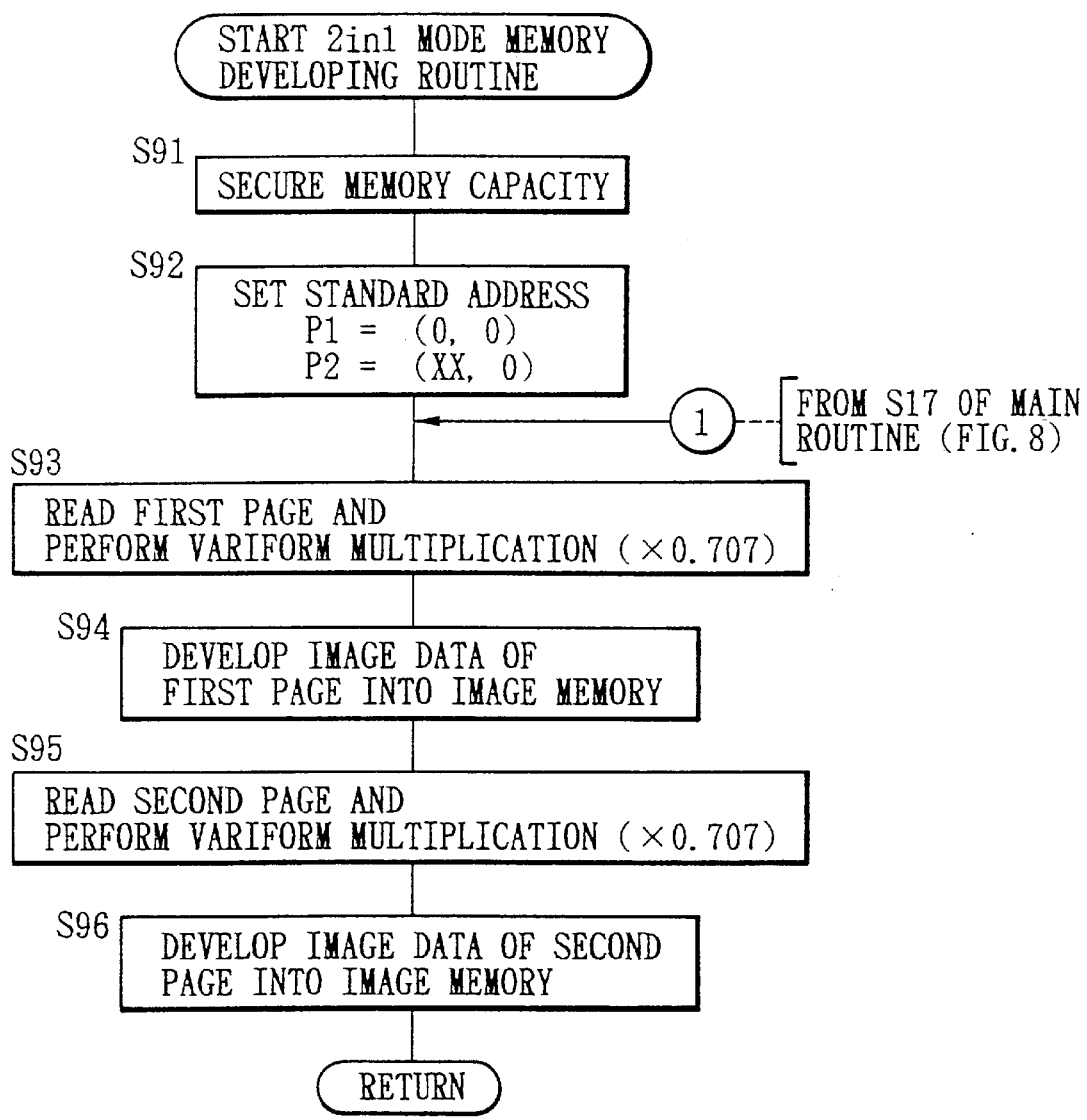
FIG. 16 is a flow chart illustrating the process for developing memory of the 2in1 mode.
Figure 17:
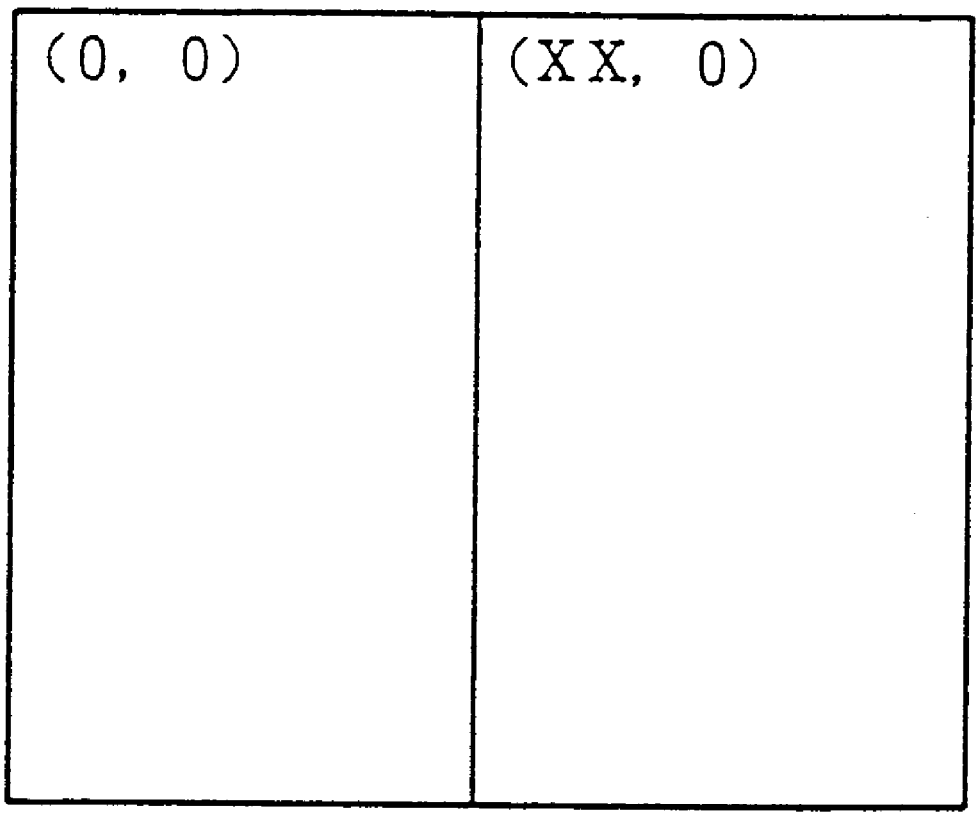
FIG. 17 is a diagram to aid in the description of the, memory address in the operation of the 2in1 mode.

FIG. 16 is a flow chart showing the flow of the processing for developing the output image in the image memory 304. This diagram depicts the development of an image in the case of 2in1 (S9 in the diagram of FIG. 8). The flow chart similarly applies to any of the other Nin1 (4in1, 8in1, and 16in1) modes. FIG. 17 is a model diagram illustrating the address position for the image data to be developed on the image memory 304 in the 2in1 mode.

First, the memory capacity for allowing the development of the output image in the image memory 304 is secured (S91). The direction (vertical or horizontal) of the image memory to be secured here is determined by the number of Nin1 original documents. The vertical direction is used for the 2in1 and the 8in1 mode and the horizontal direction for the 4in1 and the 16in1 mode.

Then, the standard address is set (S92). Here, since the image data in two original documents is to be produced in one output sheet, P1 (0, 0) forms the position for writing in the image data in the first of the two original documents and P2 (XX, 0) the position for writing in the image data in the second original document. When the Nin1 mode is other than 2in1 mode, as in the case of the 4in1 mode, for example, P1 (0,0) forms the position for the image data of the first page, P2 (XX, 0) the position for the image data of the second page, P3 (0, YY) the position for the image data of the third page, and P4 (XX, YY) the position for the image data of the fourth page. This rule similarly applies to other Nin1 modes of larger values of N. As many standard addresses as the number of N are set. Here, the value of XX (and YY) is fixed by the size of an output image (A4 size in the illustrated case) and the reduction ratio of the Nin1 mode (2in1 mode in this case) (FIG. 13; ×0.707 in the case of 2in1 mode). This value is assumed to induce no overlap of the pertinent page with the other page. In the case of the 2in1 mode, the standard address of P2 assumes the position one half the size of the output image roughly as illustrated in FIG. 17.

Then, the code data of the first original document is read out of the code memory 306, decoded by the expanding device 312, reduced by the variform multiplication processing part 309 (variform processing) (S93), and developed in the image memory 304 with the standard address of P1 mentioned above as the starting point (S94).

Subsequently, the code data of the second original document is read out of the code memory 306, decoded by the expanding device 312, reduced by the variform multiplication processing part 309 (variform processing) (S95), and developed in the image memory 304 with the standard address of P2 mentioned above as the starting point (S96).

Since the image data of two original documents is developed in the image memory 304 as image data for one sheet, it is produced as output data in accordance with the command for application (S14 or S15, S16 at in FIG. 8). Then, the question of whether or not all the image data has been produced as output data is judged (S17 of FIG. 8). When the question draws out a negative answer, the processing returns to the step S93. The development in the image memory 304 and the output of the image data in all the original documents are continued until the output of all the image data is completed.

Figure 19:
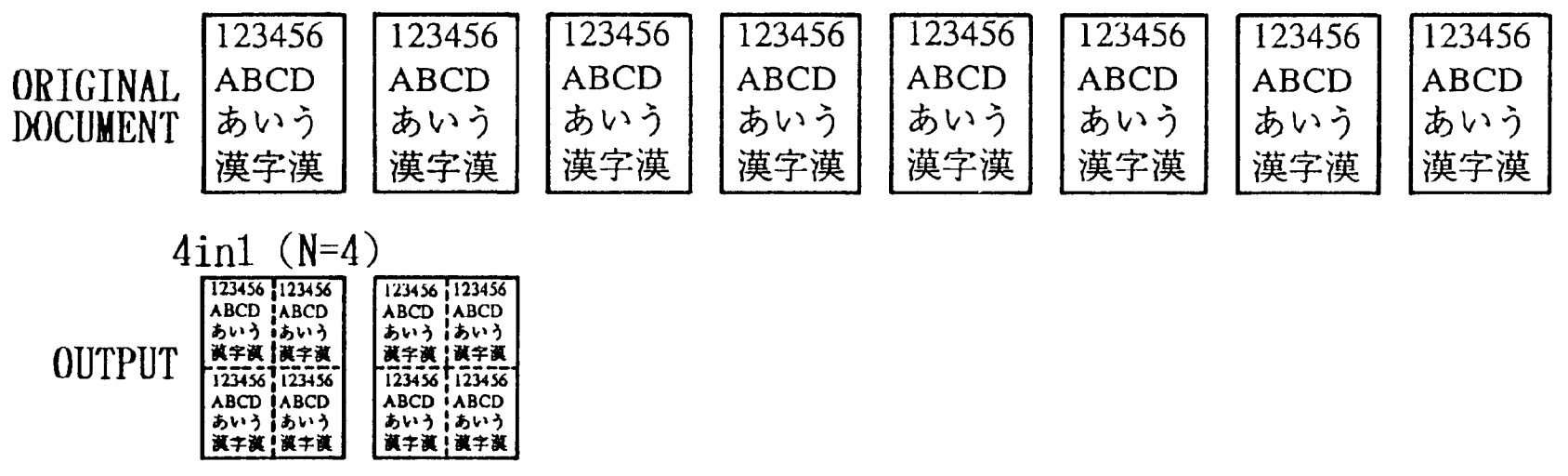

As a result, the plurality of original documents are either printed out on the sheet of the same size or transmitted by facsimile without impairing the legibility of the characters in the plurality of read original documents. FIGS. 18–20 illustrate examples of the outputs obtained by reproducing original documents containing characters of different sizes by the automatic Nin1 edit function. It is clearly noted from the diagrams that the Nin1 edit is carried out in such a manner that the sizes of characters in the original documents may avoid impairing the legibility of these characters and the plurality of original documents are produced as output data on one sheet.

As a result, the images can be obtained in the form of reduced images by the Nin1 edit without impairing the legibility of characters on the sheet of the same size as the size of the automatically read original documents. The operation for setting the Nin1 mode is not required and the reproduction by such Nin1 edit as impairs the legibility of characters can be prevented and the chances of miscopying is diminished.

Now, the second Nin1 edit function (manual Nin1 edit function) will be described below.

Figure 21:
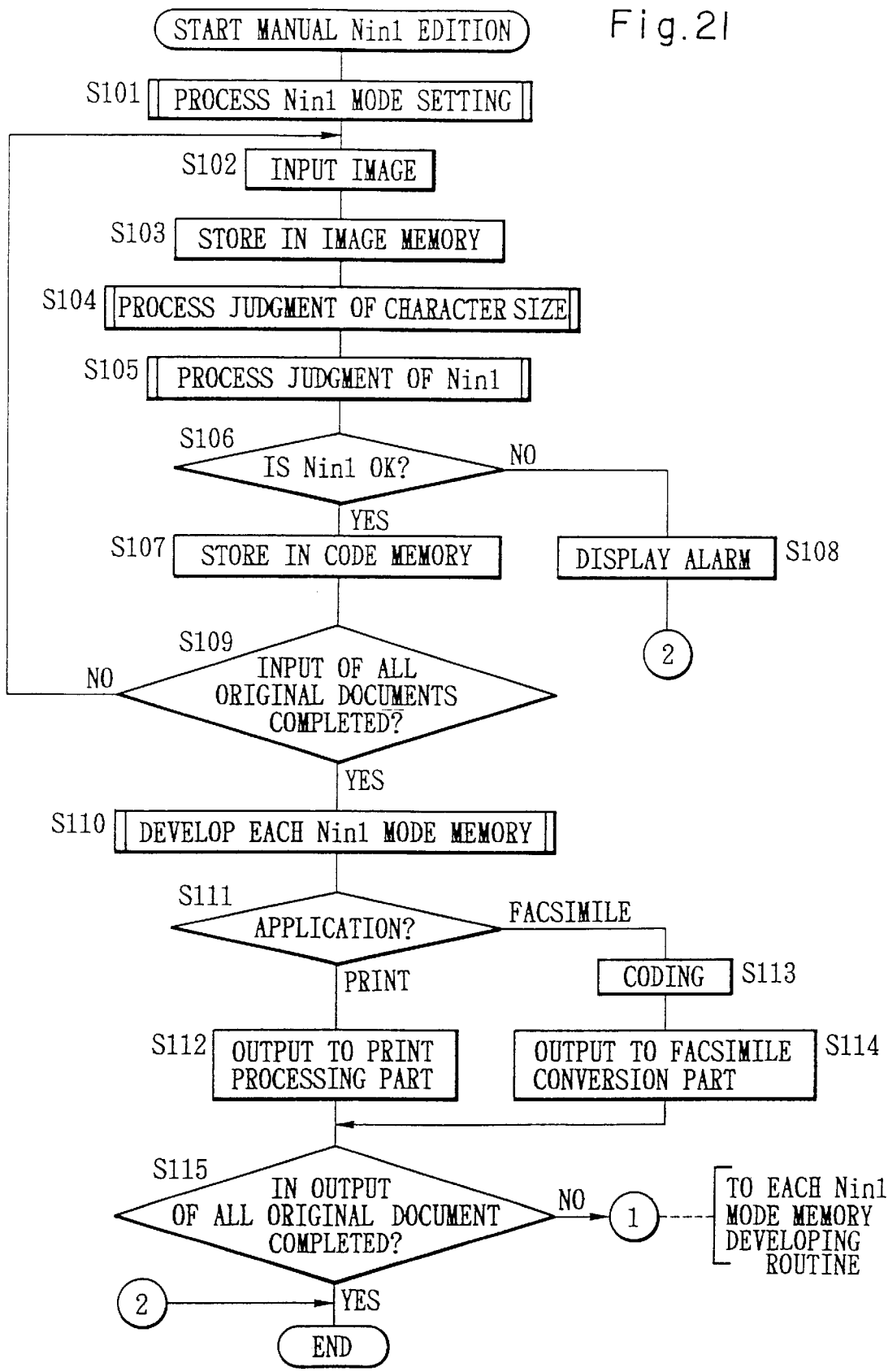
FIG. 21 is a flow chart illustrating the whole process of the manual Nin1 edit function embodying this invention.

FIG. 21 is a flow chart illustrating the flow of the whole operation of this manual Nin1 edit function.

First, the Nin1 mode is put in and set by the select key op7 on the operating panel OP (S101). By the depression of the print key op1 or the FAX key op2, the first of the original documents set on the ADF 500 is conveyed onto the platen glass 18 and the image thereon is read out (image input, S102). At this time, the size of the original document is detected by the sensor SE51 in the same manner as in the automatic Nin1 edit function mentioned above.

Then, the image processing such as the shading compensation, the MTF compensation, and the gamma compensation is carried out in the image signal processing part 20 and then the image data is stored in the image memory 304 in the memory unit part 30 (S103).

Subsequently, the character size in the original documents is judged based on the image data stored in the image memory 304 (S104) and, in the Nin1 mode set at the step S101 mentioned above, the question of whether or not the Nin1 processing can be effected with the character size judged at the step S104 mentioned above (processing for judging Nin1, S105).

When the processing for judging the Nin1 at this step S105 draws out a negative answer (S106), namely when the reproduction of the set Nin1 mode results in impairing the legibility of characters, the liquid crystal display panel op4 on the operating panel OP displays an alarm (S108) and the processing is terminated.

When the processing for judging the Nin1 at the step S105 draws out an affirmative answer (S106), the image data of the original document is coded and stored in the code memory 306 (S107).

Then, the question of whether or not all the original documents set in the ADF 500 have been read out and the processing mentioned above has been completed is judged (S109). If this question draws out a negative answer, the processing of the steps, S102–S109, is carried out for reading out the following original document and performing the processing. When any of the original documents is judged to produce an output NG in the Nin1 mode and the alarm about this fact is displayed as described above, the processing is terminated at once then. When the alarm is displayed and the processing is terminated, the reproduction by the Nin1 mode may be forcibly continued by an input operation through the operating panel OP.

When the reading of all the original documents and the processing are completed, the code data of the plurality of original documents stored in the code memory 306 is decoded in accordance with the set Nin1 mode and the image data of one sheet is developed in the image memory 304 (S110). Then, in the same manner as in the automatic Nin1 edit function mentioned above, the destination (application) of the one sheet full of images developed in the image memory 304 is selected between the printout and the facsimile transmission by the input introduced in advance from the operating panel OP (S111). The image data is put out in the print processing part 40 in the case of the printout (S112) or encoded again in the case of the facsimile transmission (S113) and put out into the facsimile conversion part 41 (S114). In the case of the facsimile transmission, the telephone number of the other party of facsimile communication is introduced in advance (at the time the original documents are set).

Then, the question of whether or not all the original documents have been put out is judged (S115). When this question draws out a negative answer, the processing returns to the subroutine (S110) for the development of memory and the development of memory is continued until all the original documents are put out.

The development of the image data in the image memory 304 in the present case is identical with that of the automatic Nin1 edit function described above with reference to FIG. 16 and, therefore, will be omitted from the following description.

The flow of the whole processing has been described above. Now, the processing which is peculiar to the manual Nin1 edit function will be described below.

Figure 22:
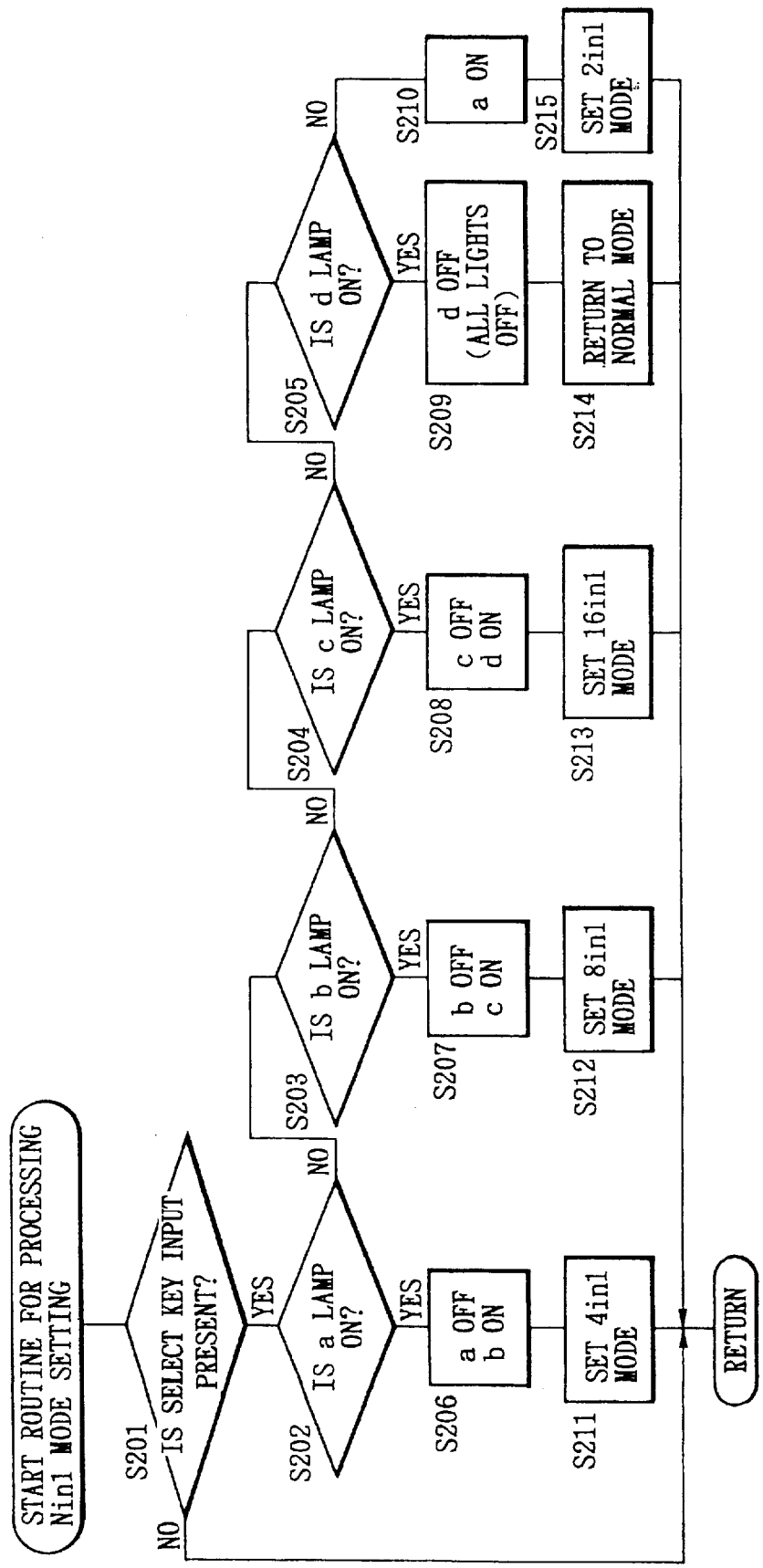
FIG. 22 is a flow chart illustrating the process for setting the Nin1 mode in the manual Nin1 edit function mentioned above.

FIG. 22 is a flow chart illustrating the flow of the processing for setting the Nin1 mode at the step S101 of FIG. 21.

The processing for setting the Nin1 mode is performed by the manual operation of the select key op7 on the operating panel OP. Each time the select key op7 is depressed, the glow sequentially shifts on the display lamps op8 a–d, indicating the switch of the Nin1 mode through 2in1, 4in1, 8in1, and 16in1 modes. First, the question of whether or not the select key op7 has been turned on is judged (S201). If the question draws out an affirmative answer, the question of whether or not any of the lamps a–d is glowing (S202–S205) and the display lamps representing the Nin1 modes are sequentially turned on and off (S206–S210) to set the relevant Nin1 mode (S211–S215).

When the depression of the select key op7 is detected in the state of an ordinary mode, namely in the state in which all the display lamps a–d indicating the Nin1 mode are off (S201), the lamp a is lit on (S210) and the 2in1 mode is set (S215) because the judgments at the steps S202–205 are invariably in the negative. When the select key op7 is subsequently depressed, the Nin1 mode is sequentially switched; if the lamp a happens to be on (S202), the lamp a will turned off and the lamp b turned on (S206) to set the 4in1 mode (S211). When the select key op7 is further depressed while the lamp b is on (S203), the lamp b is turned off and the lamp c is turned on (S207) to set the 8in1 mode (S212). When the select key op7 is again depressed while the lamp c is on (S204), the lamp c is turned off and the lamp d is turned on (S208) to set the 16in1 mode (S213). When the select key op7 is further depressed while the lamp d is on (S205), the lamp d is turned off to put all the display lamps a–d off (S209) to resume the ordinary mode (S214).

Now, the processing for judging the character size (step S104 in the diagram of FIG. 21) will be described below.

Figure 23:
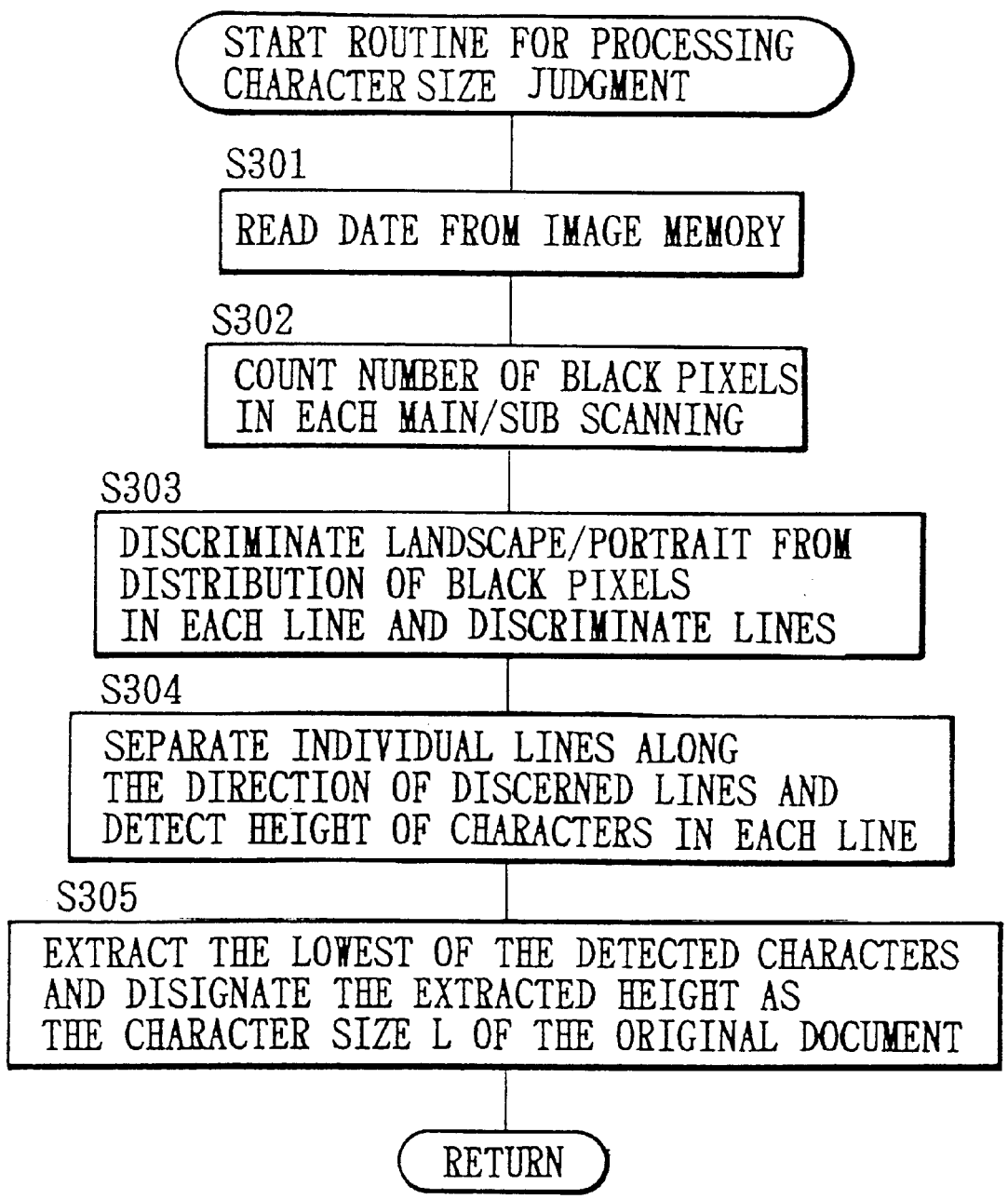
FIG. 23 is a flowchart illustrating the process of discerning the character size in the manual Nin1 edit function mentioned above.

FIG. 23 is a flow chart illustrating the flow of the processing for judging the character size.

This processing for judging the character size comprises first reading the image data in one original document stored in the image memory 304 (S301), counting the numbers of black pixels in the successive lines of the direction of main and sub scanning (S302), and discriminating between a portrait original document and a landscape original document based on the distribution in the lines of the direction of main and sub scanning (S303).

Figure 11A:
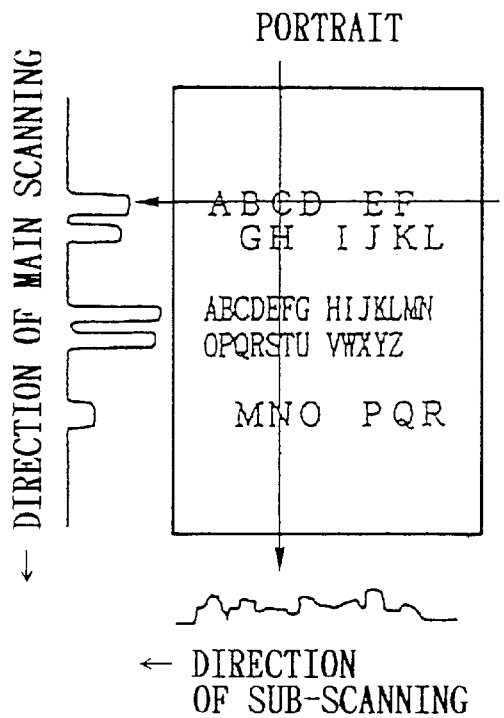
FIGS. 11(A) and (B) are diagrams illustrating the histogram of picture element distribution.
Figure 11B:
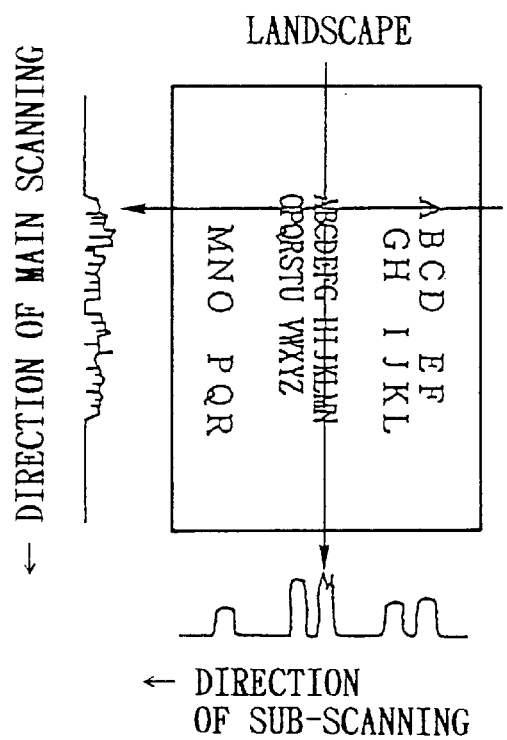

This discrimination between a portrait original document and a landscape original document is similar to what is involved in the automatic Nin1 edit function mentioned above (FIG. 11). It is performed for the purpose of judging the height (or width) of characters as the character size which will be specifically described herein below. It is effected by judging the question of whether or not the successive pixels in the data in the direction of main scanning and the direction of sub scanning are black pixels (whether the data is "0" or "1") while the image data is read out of the image memory 304 at the step S302, counting the numbers of black pixels (data "1"), finding distribution of the black pixels in the individual lines in the direction of main and sub scanning as shown in FIGS. 11A and 11B based on the result of the counting, and discerning the direction in which the lines are arranged.

Then, the individual lines are cut out as shown in FIG. 12 and the heights of the individual lines are detected as the character size (S304). In the case of an original document which has characters arranged in vertical lines, the widths of the lines or the widths of characters are detected as the character size. This character size is determined by counting the numbers of pixels in the individual lines thereby fixing the heights (or widths) of the lines.

Then, the lowest (or the narrowest) of the detected character sizes or the detected heights (or widths) of the individual lines, namely the size of the smallest number of pixels in the direction of height (width), is adopted as the character size L of the original document (S305). As a result, the character size in the original document is judged.

Now, the processing for judging the Nin1 which decides the question of whether or not the output can be attained by the Nin1 mode which is set based on the set character size L will be described below (the step S105 in FIG. 21).

Figure 24:
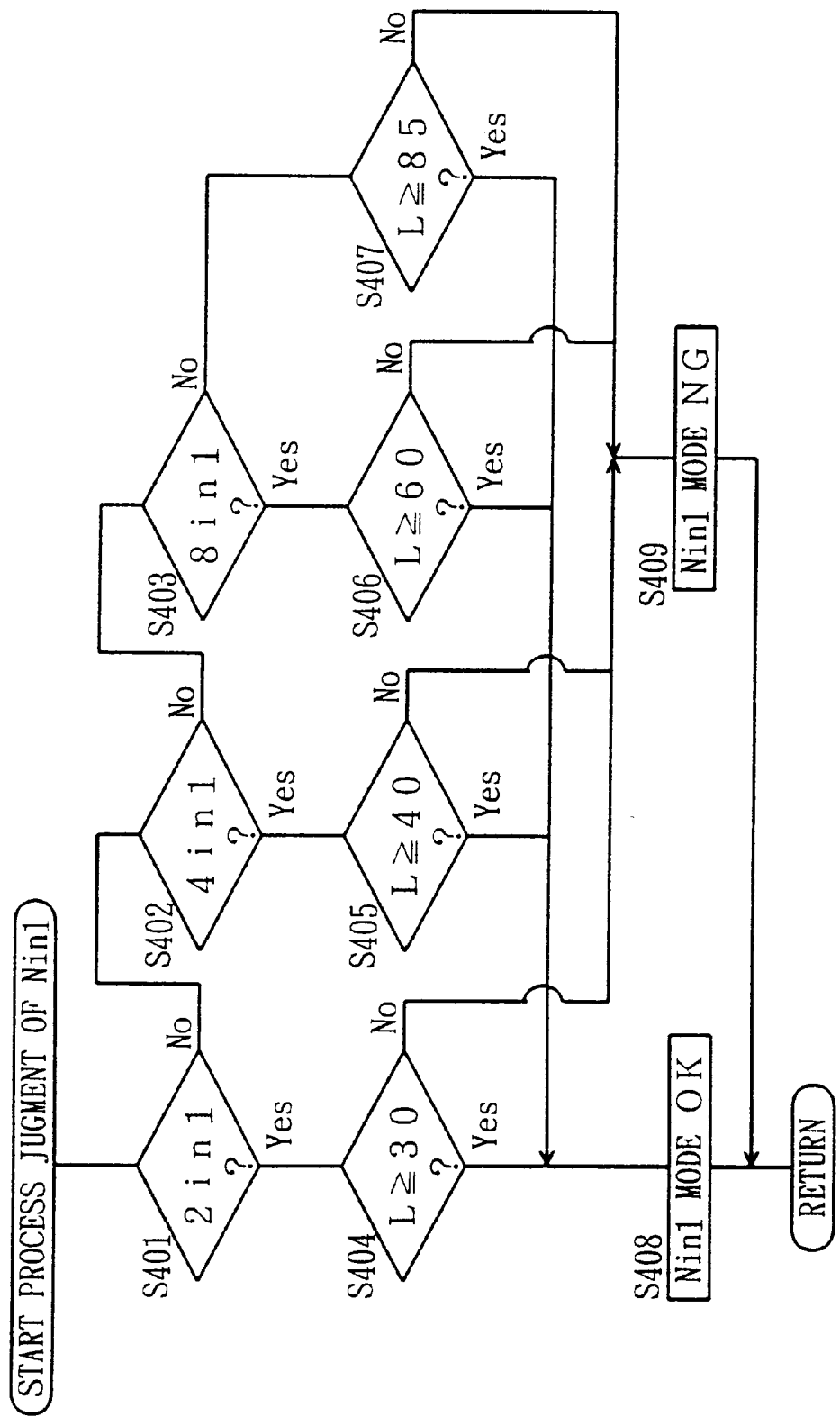
FIG. 24 is a flow chart illustrating the process for discerning the Nin1 in the manual Nin1 edit function mentioned above.

FIG. 24 is a flow chart illustrating the flow of the processing for judging the Nin1.

First, the Nin1 mode which is already set is identified (S401–S403). The identification is effected by examining the existing Nin1 to determine whether it is 2in1 (S401), 4in1 (S402), or 8in1 (S403). When it is found to be none of these states, it is judged that the state of 16in1 has been set.

When this judgment finds that the state of 2in1 has been set, the question of whether or not the character size L consists of not less than 30 pixels (S404). If the question draws out an affirmative answer, the Nin1 mode is rated as OK (S408). If the question draws out a negative answer, it is rated as NG (S409). Where the state of 4in1 is set, the question of whether or not the character size L consists of not less than 40 pixels is judged (S405). If the question draws out an affirmative answer, the Nin1 mode is rated as OK (S408). If the question draws out a negative answer, it is rated as NG (S409). Where the state of 8in1 is set, the question of whether or not the character size L consists of not less than 60 pixels is judged (S406). If the question draws out an affirmative answer, the Nin1 mode is rated as OK (S408). If the question draws out a negative answer, it is rated as NG (S409). Where the state of 16in1 is set, the question of whether or not the character size L consists of not less than 85 pixels is judged (S407). If the question draws out an affirmative answer, the Nin1 mode is rated as OK (S408). If the question draws out a negative answer, it is rated as NG (S409).

As described above, this manual Nin1 function comprises judging the question of whether the Nin1 mode set by the character size in the read original document is rated OK or NG and, when the question draws out an affirmative answer, storing the original document in the code memory 306 and, when all the original documents are found OK, effects the output of image data by the set Nin1 mode or, when any of the original documents is found to produce reduced images which impair the legibility of characters, displaying an alarm about this state, and stopping the processing. By this function, such Nin1 edit as impairs the legibility of characters can be prevented and the chances of miscopying is diminished.

Now, the third Nin1 edit function (economized Nin1 edit function) will be described below. Incidentally, this economized Nin1 edit function assumes the precondition that the images obtained by the Nin1 edit are printed out by the use of stacks of sheet of different sizes which are stowed in the reproducing device 1.

Figure 25:
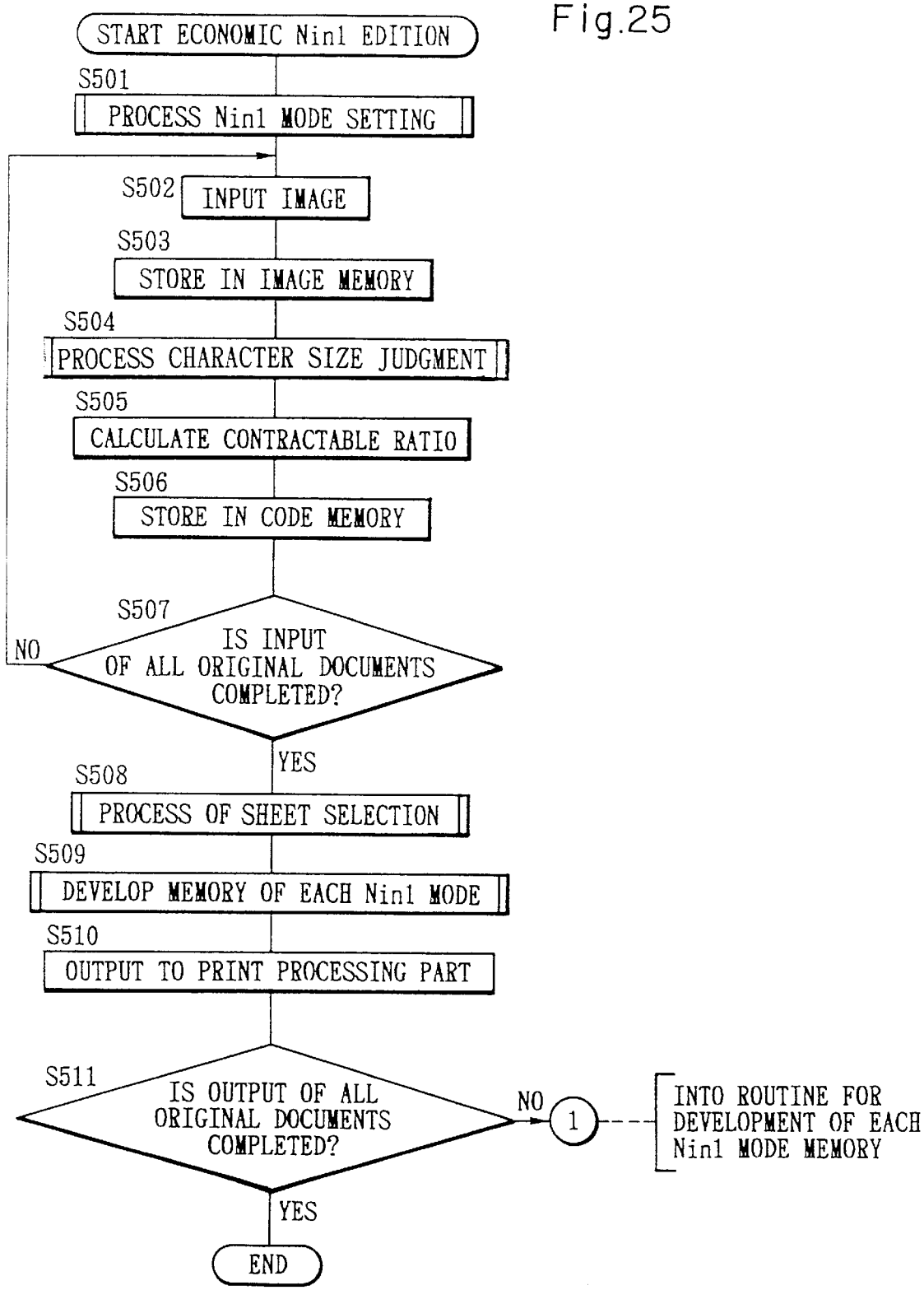
FIG. 25 is a flow chart illustrating the whole process of the economized Nin1 edit function embodying this invention.

FIG. 25 is a flow chart illustrating the flow of the whole operation of the economized Nin1 edit function.

First, the Nin1 mode is put in and set by the depression of the select key op7 on the operating panel OP and, at the same time, the economized Nin1 edit function is selected by the depression of the economized Nin1 key op9 (S501). The setting of the Nin1 mode is similar to what has been described in the manual Nin1 edit function mentioned above and, therefore, will be omitted from the following description (FIG. 22).

Then, the first of the original documents set in the ADF 500 is conveyed onto the platen glass 18 and the image therein is read out by the depression of the print key op1 (image input, S502). At this time, the size of the original document is detected by the sensor SE51 in the same manner as in the automatic Nin1 edit function and the manual Nin1 edit function mentioned above.

Then, after the image processing such as the shading compensation, the MTF compensation, and the gamma compensation has been performed in the image signal processing part 20, the image data is stored in the image memory 304 in the memory unit part 30 (S503).

Subsequently, the character size L in the original document is judged based on the image data stored in the image memory 304 (S504). The processing for judging the character size is similar to what has been described in the manual Nin1 edit function above with reference to FIG. 23 and, therefore, will be omitted from the following description.

Then, the reduction ratio which avoids impairing the legibility of characters in the original document will be calculated based on the detected character size L (S505). The calculation of the reduction ratio is made by dividing the standard number of pixels in characters by the number of pixels of the detected character size. In the economized Nin1 edit function, the standard number of pixels in characters, namely, the smallest character size, i.e. 20 pixels herein, that retains legibility is divided by the detected character size L (reduction ratio=20 pixels/character size L).

Subsequently, the image data in the read original document is stored in the code memory 306 (S506). At this time, the reduction ratio of the original document is stored together with the code data. Incidentally, the data of the code memory 306 are similar to those described above with reference to FIG. 6. The reduction ratio is found for each original document and is memorized as added information (FIG. 6).

The question of whether or not all the original documents set in the ADF 500 have been read out and the processing has been completed is judged (S507). If the question draws out a negative answer, the processing of the steps S502–S507 will be performed for the purpose of reading out the following original documents and performing the processing.

After all the original documents have been read out and the processing has been completed, the sheets are selected so that the original documents will be reproduced on the smallest sheets in accordance with the set Nin1 mode without impairing the legibility of the characters in the reduced images (processing for selecting sheet, S508). At this time, the reduction ratios appropriate for the selected sheets are fixed at the same time. The processing for selecting the sheets will be described specifically herein below.

Then, the code data of the plurality of original documents stored in the code memory 306 are developed as image data for one sheet in the image memory 304 in accordance with the selected sheets and reduction ratios (S509) and the image data for one sheet developed in the image memory 304 are forwarded to the print processing part 40 and printed out (S510).

Subsequently, the question of whether or not the image data in all the original documents have been put out is judged (S511). If this question draws out a negative answer, the processing will return to the subroutine for the development of memory and the development of memory will be continued until all the original documents are put out.

The development of the image data in the image memory 304 mentioned above (S509) is similar to what has been already described in the automatic Nin1 edit function with reference to FIG. 16 and, therefore, will be omitted from the following description.

The flow of the whole processing has been described. Now, the processing for selecting the sheets (step S508) which is peculiar to the economized Nin1 edit function will be further described below.

Figure 26:
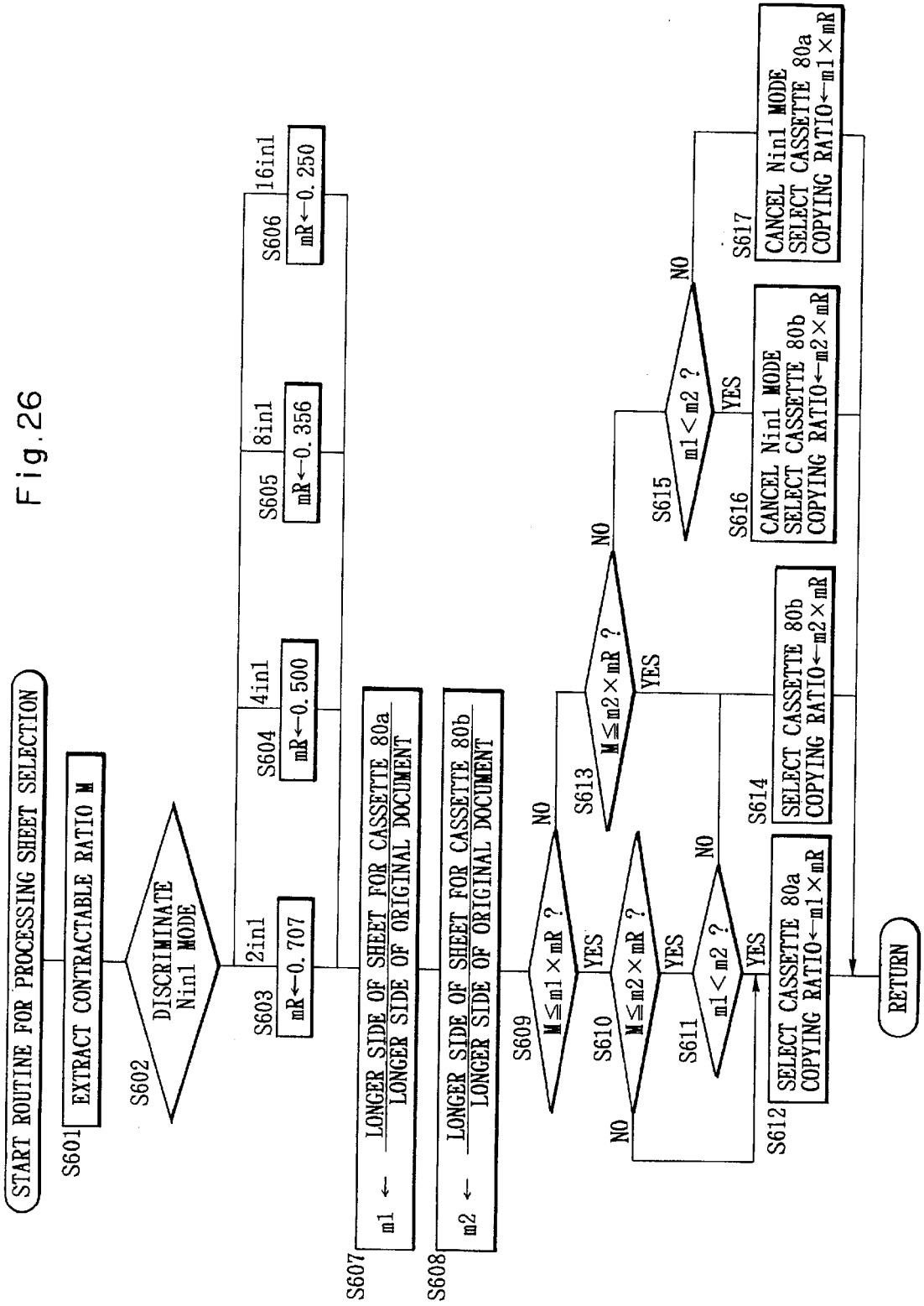
FIG. 26 is a flow chart illustrating the process for sheet selection in the economized Nin1 edit function mentioned above.

FIG. 26 is a flow chart illustrating the flow of the processing for selecting the sheets.

First, the reduction ratios are read out of the code data of the individual pages and the largest of these reduction ratios is extracted as the reduction ratio M (S601). This step is equivalent to extracting from among the plurality of original documents which have been read in the original document that has a high possibility of impairing the legibility of characters.

Then, the Nin1 mode set in advance is identified (S602) and the reduction ratios mR for the individual modes are set (S603–S606). The reduction ratios mR which are set at this time are the reduction ratios which are used when the original documents are reproduced by the Nin1 edit on the sheet of the same size as the size of the read original documents.

Subsequently, the reduction ratio of the size of the sheet to the size of the original document is fixed by dividing the longer side of the sheet stored in the cassette 80a by the longer side of the read original document and the reduction ratio thus fixed is set as the reduction ratio m1 due to the size of the sheet (S607). Similarly, the reduction ratio of the size of the sheet to the size of the original document is fixed by dividing the longer side of the sheet stored in the cassette 80b by the longer side of the read original document and the reduction ratio thus fixed is set as the reduction ratio m2 due to the size of the sheet (S608).

Then, the question of whether or not the Nin1 edit is attainable is judged. For this purpose, the question of whether or not the reduction ratio M falls within the product of the reduction ratio m1 due to the size of sheet multiplied by the reduction ratio mR of the Nin1 mode is judged (S609).

When this question draws out an affirmative answer, the question of whether or not the reduction ratio M falls within the product of the reduction ratio m2 due to the size of sheet multiplied by the reduction ratio mR of the Nin1 mode is judged (S610).

When the question draws out a negative answer, i.e. when the reproduction by the Nin1 mode set as reduced is found attainable with the sheet stowed in the cassette 80a, the sheets stowed in the cassette 80a is selected and the product of the reduction ratio m1 due to the size of sheet multiplied by the reduction ratio mR of the Nin1 mode (m1×mR) is set as the reduction ratio for the selected sheet (S612).

When the question at the step S610 mentioned above draws out an affirmative answer, namely when the sheet stored in the cassette 80a and the sheet stored in the cassette 80b are both found usable, the reduction ratios m1 and m2 for the smallest possible size of sheets in the individual cassettes are compared to permit selection of the sheet of the smallest possible size in the cassette (S611), the sheet of the smaller size is selected, and the reduction ratio for the selected sheet is set (S612 or S614).

When the question at the step S609 mentioned above draws out a negative answer, the question of whether or not the reduction ratio M falls within the product of the reduction ratio m2 due to the size of sheet multiplied by the reduction ratio mR of the Nin1 mode is judged (S613). When the question draws out an affirmative answer, namely when the reproduction by the Nin1 mode set as reduced is found attainable with the sheet stowed in the cassette 80*b*, the sheets stowed in the cassette 80*b* is selected and the product of the reduction ratio m2 due to the size of sheet multiplied by the reduction ratio mR of the Nin1 mode (m2×mR) is set as the reduction ratio for the selected sheet (S614).

When the question at the step S613 draws out a negative answer, namely when the reproduction by the set Nin1 mode is found impossible with the sheets stored in the cassette 80*a* and in the cassette 80*b*, the reduction ratios m1 and m2 due to the size of sheet are compared (S615), the Nin1 mode is canceled, and the sheet of the largest possible size is selected, and the reduction ratio due to the selected size of sheet is set (S616 or S617).

Thereafter, for the sake of producing reduced copies of the set Nin1 mode (S612 or S614) or ordinary mode with the selected sheet by the selected reduction ratio, the memory development and the printout by the Nin1 mode or the ordinary mode are carried out as already described.

Figure 27:
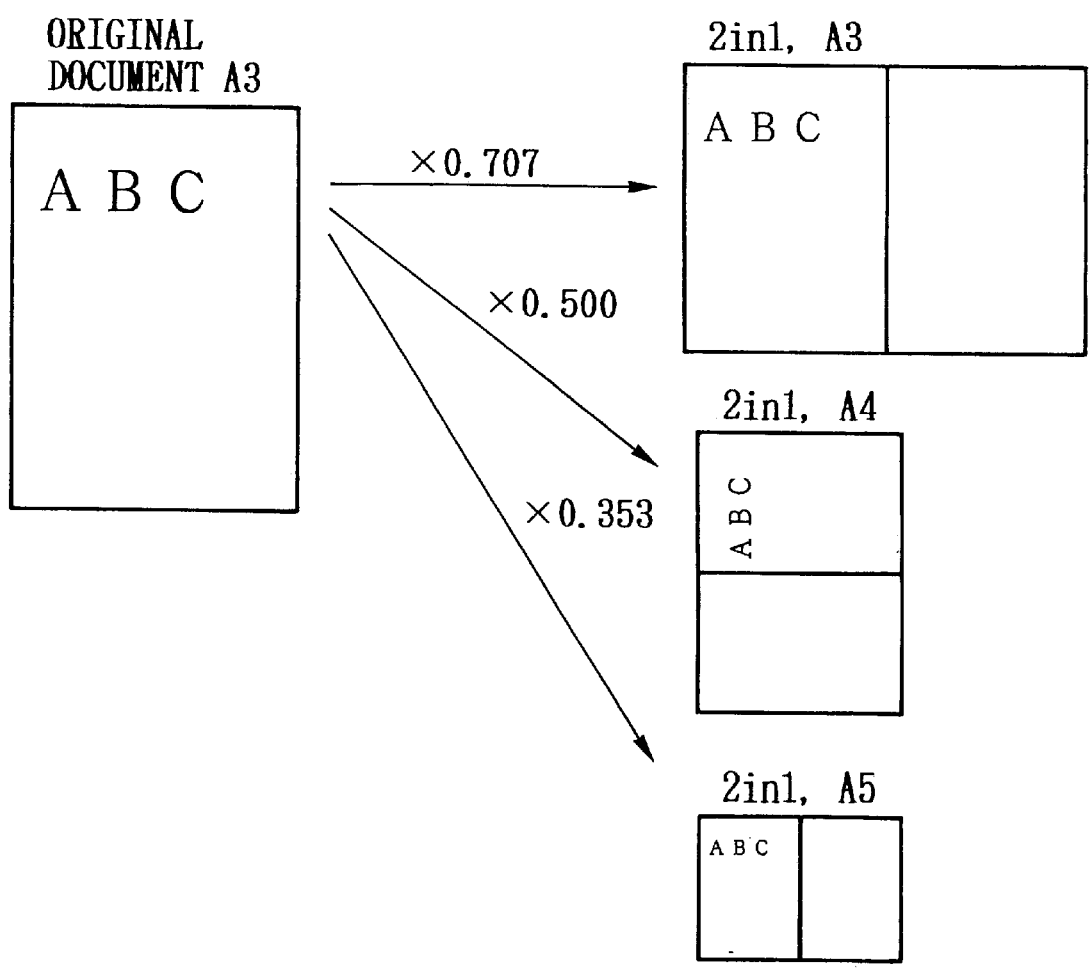
FIG. 27 is a diagram to aid in the description of the outcome of the execution of reproduction by the economized Nin1 edit function mentioned above.
Figure 29:
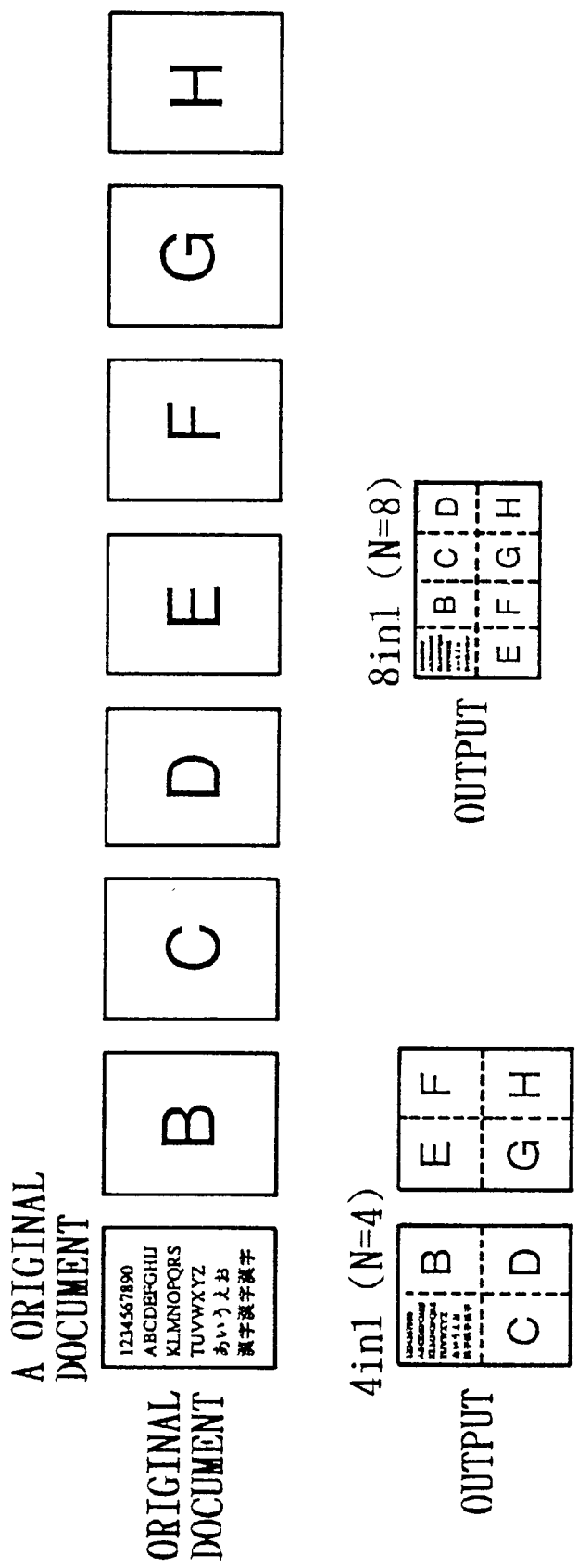
FIG. 29 is a diagram to aid in the description of the outcome of the execution of reproduction by the conventional Nin1 edit.

When the economized Nin1 mode is executed as when original documents of the size of A3 are read out and the 2in1 is set as the Nin1 mode, for example, the sheet of the smallest size that avoids impairing the legibility of characters will be selected automatically from among the sheets of varying sizes such as, for example, A3, A4, and A5, which are stowed in the cassette 80*a* or 80*b* as shown in FIG. 27 and the reproduced copies are printed out on the selected sheet.

What is claimed is:

1. An image editing apparatus comprising:
   reading means for reading image data from a plurality of original documents;
   character size detecting means for detecting the size of characters on said original documents based on said read image data;
   number setting means for setting the number of original document images to be produced in one page based on the character size detected by said character size detecting means; and
   editing means for reducing and editing the read image data into output data having such a number of proportionally reduced original document images per page as set by said number setting means.

2. An image editing apparatus according to claim 1, wherein said number setting means sets such a number of original document images to be produced per page that the characters in the original document images reduced by said editing means have a size larger than predetermined size.

3. An image editing apparatus according to claim 2, wherein said predetermined size is such that the characters in said reduced images do not lose legibility.

4. An image editing apparatus according to claim 1, wherein said number setting means is provided with a table showing correspondences between the detected character size, the number of original document images to be produced per page and the image reduction ratio, and sets the number of original document images to be produced per page and the image reduction ratio based on the character size detected by said character size detecting means with reference to said table, and wherein said editing means reduces the read image data of said original documents based on said set reduction ratio.

5. An image editing apparatus comprising:
   reading means for reading image data from a plurality of original documents;
   number input means for feeding the number of proportionally reduced original document images to be produced per page; editing means for reducing and editing the read image data into output data having such a number of proportionally reduced original document images per page as fed by said number input means;
   character size detecting means for detecting the size of characters on said original documents based on said read image data; and
   judging means for, based on the character size detected by said character size detecting means, judging whether or not the image edit of said editing means with the number fed by said number input means is acceptable.

6. An image editing apparatus according to claim 5, wherein said judging means judges said image edit is acceptable when the character size detected by said character size detecting means is larger than a predetermined size.

7. An image editing apparatus according to claim 6, wherein said predetermined size is such that, when the original document images are reduced by said editing means based on the number of original document images fed by said number input means, the characters in the reduced images still retain legibility.

8. An image editing apparatus, comprising:
   reading means for reading image data from a plurality of original documents;
   number input means for feeding the number of proportionally reduced original document images to be produced per page;
   editing means for reducing and editing the read image data into output data having such a number of proportionally reduced original document images per page as fed by said number input means;
   character size detecting means for detecting the size of characters on said original documents based on said read image data;
   judging means for, based on the character size detected by said character size detecting means, judging whether or not the image edit of said editing means with the number fed by said number input means is acceptable; and
   alarm means for issuing an alarm when said judging means judges the image edit of said editing means is not acceptable.

9. An image editing apparatus comprising:
   reading means for reading image data from a plurality of original documents;
   number input means for feeding the number of proportionally reduced original document images to be produced per page;
   editing means for reducing and editing the read image data into output data having such a number of proportionally reduced original document images per page as fed by said number input means;
   character size detecting means for detecting the size of characters on said original documents based on said read image data; and sheet selecting means for selecting the size of sheet on which the proportionally reduced original document images as output are printed based on the character size detected by said character size detecting means and the number fed by said number input means.

10. An image editing apparatus according to claim 9, wherein said sheet selecting means selects such a size of sheet that predetermined reduction ratio corresponding to character size is smaller than the reduction ratio for the image edit of said editing means with the number fed by said number input means.

11. An image editing apparatus according to claim 10, wherein said predetermined reduction ratio is the value obtained by dividing the value of predetermined character size by the value of the character size detected by said character size detecting means.

12. An image editing apparatus according to claim 11, wherein said predetermined character size is such that the characters in the reduced original document images still retain legibility.

13. An image editing apparatus according to claim 9, wherein said image editing apparatus further comprises a plurality of sheet storing means for severally storing a set of sheets, which sheet size of several set stored in said sheet storing means is different from each other, and wherein said sheet selecting means selects the sheet storing means which stores the sheet set of smallest size of such a size of sheet that predetermined reduction ratio corresponding to character size is smaller than the reduction ratio for the image edit of said editing means with the number fed by said number input means.

14. An image editing apparatus according to claim 13, wherein said sheet selecting means sets to said editing means the reduction ratio for said image edit on the sheet stored in the selected sheet storing means with the number fed by said number input means.

* * * * *